(12) United States Patent
Engel-Hall et al.

(10) Patent No.: US 10,086,525 B2
(45) Date of Patent: Oct. 2, 2018

(54) SYSTEMS AND METHODS FOR DISPENSING, SLICING, BUTTERING, AND TOASTING BREAD

(71) Applicant: Momentum Machines Company, San Francisco, CA (US)

(72) Inventors: Aaron Engel-Hall, San Francisco, CA (US); Alexandros Vardakostas, San Francisco, CA (US); John Lawrence McDonald, Oakland, CA (US); Matthew Williams, San Francisco, CA (US); Steven Frehn, San Francisco, CA (US); Thomas Hanson, San Francisco, CA (US)

(73) Assignee: Creator, Inc., San Francisco, CA (US)

( * ) Notice: Subject to any disclaimer, the term of this patent is extended or adjusted under 35 U.S.C. 154(b) by 245 days.

(21) Appl. No.: 14/868,763

(22) Filed: Sep. 29, 2015

(65) Prior Publication Data

US 2016/0236367 A1    Aug. 18, 2016

Related U.S. Application Data

(60) Provisional application No. 62/056,976, filed on Sep. 29, 2014, provisional application No. 62/056,971, filed on Sep. 29, 2014.

(51) Int. Cl.
*B26D 3/30* (2006.01)
*A47J 37/08* (2006.01)
(Continued)

(52) U.S. Cl.
CPC .............. *B26D 3/30* (2013.01); *A21C 15/002* (2013.01); *A21C 15/007* (2013.01); *A21C 15/04* (2013.01);
(Continued)

(58) Field of Classification Search
CPC ... B26D 3/00; B26D 3/30; B26D 7/27; B26D 7/32; B26D 7/327; B26D 7/34; A21C 15/00; A21C 15/04
(Continued)

(56) References Cited

U.S. PATENT DOCUMENTS 2,804,818 A    9/1957    March
3,611,913 A    10/1971   McGinley
(Continued)

FOREIGN PATENT DOCUMENTS

EP    0296496 A2    12/1988
JP    H06007127 A    1/1994
(Continued)

OTHER PUBLICATIONS

International Search Report and Written Opinion for PCT Application No. PCT/US2016/054563, dated Dec. 20, 2016, 13 pages.

*Primary Examiner* — Jason Daniel Prone
*Assistant Examiner* — Richard Crosby, Jr.
(74) *Attorney, Agent, or Firm* — Harness, Dickey & Pierce, P.L.C.

(57) ABSTRACT

One variation of a method for slicing a type of whole bread buns includes: retracting a cutting block along a chute into a load position; dispensing a whole bread bun into the chute between the cutting block and a blade extending across the chute; advancing the cutting block along the chute toward the blade; detecting contact between the cutting block and the blade at a contact position; at a first time, advancing the cutting block into a pierce position offset from the contact position toward the blade by a pierce distance less than a common width of the type of whole bread buns; and, at a second time succeeding the first time by a pierce duration,
(Continued)

advancing the cutting block from the pierce position into a slice position adjacent the blade to drive the whole bread bun fully through the blade.

11 Claims, 8 Drawing Sheets

(51) Int. Cl.
| | |
|---|---|
| A47J 9/00 | (2006.01) |
| B26D 1/02 | (2006.01) |
| B26D 5/20 | (2006.01) |
| B26D 7/06 | (2006.01) |
| B26D 7/34 | (2006.01) |
| A21C 15/00 | (2006.01) |
| A21C 15/04 | (2006.01) |

(52) U.S. Cl.
CPC ........... *A47J 9/001* (2013.01); *A47J 37/0857* (2013.01); *A47J 37/0864* (2013.01); *A47J 37/0871* (2013.01); *B26D 1/02* (2013.01); *B26D 5/20* (2013.01); *B26D 7/0658* (2013.01); *B26D 7/34* (2013.01)

(58) Field of Classification Search
USPC .................................. 426/503, 518
See application file for complete search history.

(56) References Cited

U.S. PATENT DOCUMENTS

| | | | |
|---|---|---|---|
| 3,712,207 A | 1/1973 | McGinley et al. | |
| 4,000,831 A | 1/1977 | House | |
| 5,335,571 A * | 8/1994 | Pike | B26D 5/00 83/13 |
| 5,365,835 A | 11/1994 | Naramura | |
| 5,485,772 A | 1/1996 | Bastasch et al. | |
| 5,493,958 A | 2/1996 | Naramura | |
| 5,540,943 A | 7/1996 | Naramura | |
| 5,546,848 A | 8/1996 | Naramura | |
| 5,549,040 A | 8/1996 | Naramura | |
| 5,562,183 A | 10/1996 | Naramura | |
| 5,690,013 A | 11/1997 | Kanarek et al. | |
| 5,732,852 A | 3/1998 | Baker et al. | |
| 6,042,864 A * | 3/2000 | Bastasch | A21C 15/04 426/497 |
| 6,415,700 B1 * | 7/2002 | Hunn | B26D 1/553 83/599 |
| 6,619,170 B2 * | 9/2003 | Kaplan | A21C 15/04 83/155 |
| 6,748,837 B2 * | 6/2004 | Benjamin | B26D 3/30 83/435.2 |
| 7,285,755 B1 * | 10/2007 | Kingdon | A47J 37/0857 219/388 |
| 7,430,947 B2 * | 10/2008 | Julian | B26D 1/26 83/207 |
| 7,493,841 B1 * | 2/2009 | Kaplan | B26D 1/147 241/262 |
| 2001/0052277 A1 * | 12/2001 | Giovanni | B26D 5/12 83/13 |
| 2002/0018687 A1 | 2/2002 | Owings | |
| 2005/0242077 A1 | 11/2005 | Burtea | |
| 2011/0256286 A1 * | 10/2011 | Ewald | A23L 1/0121 426/456 |
| 2014/0076173 A1 | 3/2014 | Pellaud et al. | |
| 2016/0183728 A1 * | 6/2016 | Engel-Hall et al. | A47J 37/0864 426/466 |

FOREIGN PATENT DOCUMENTS

| | | |
|---|---|---|
| JP | H07215471 A | 8/1995 |
| JP | H07215472 A | 8/1995 |
| JP | H07227195 A | 8/1995 |
| JP | H07227196 A | 8/1995 |
| JP | H07227197 A | 8/1995 |
| JP | H07227198 A | 8/1995 |
| JP | H07227199 A | 8/1995 |
| JP | H07232807 A | 9/1995 |
| JP | H07255604 A | 10/1995 |
| JP | H07313373 A | 12/1995 |
| JP | H0871003 A | 3/1996 |
| JP | 3178899 B2 | 6/2001 |
| WO | WO-2011129873 A1 | 10/2011 |

* cited by examiner

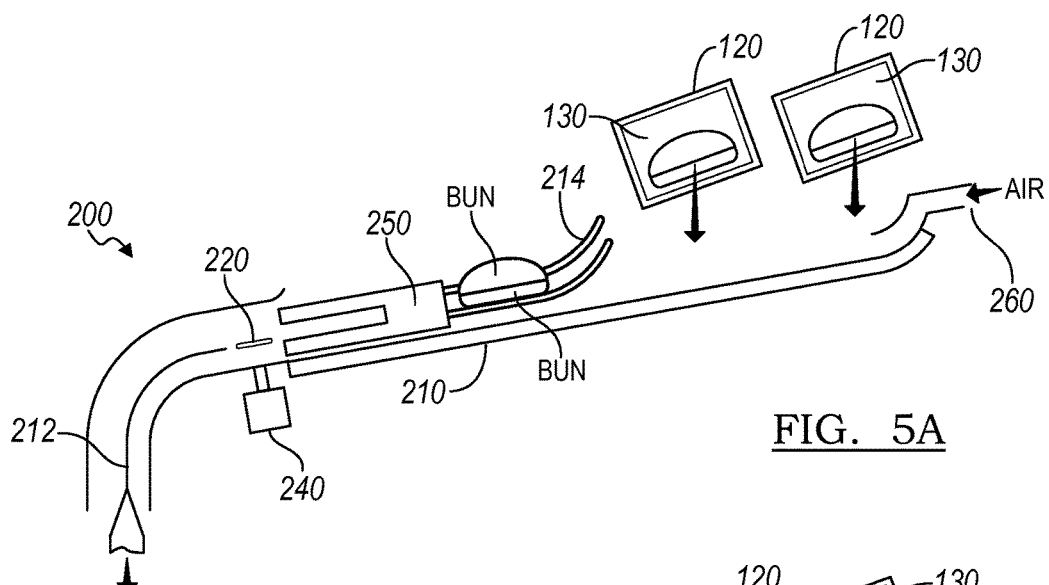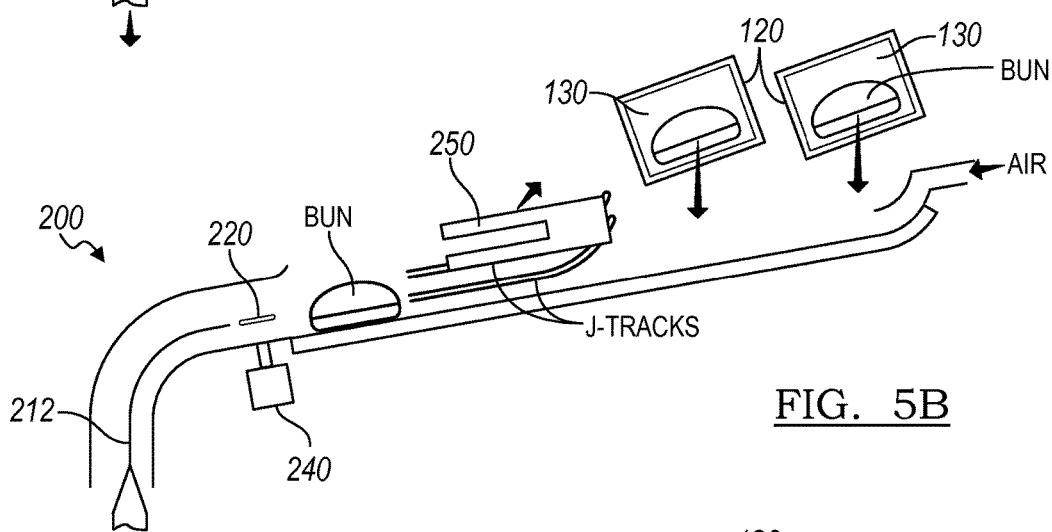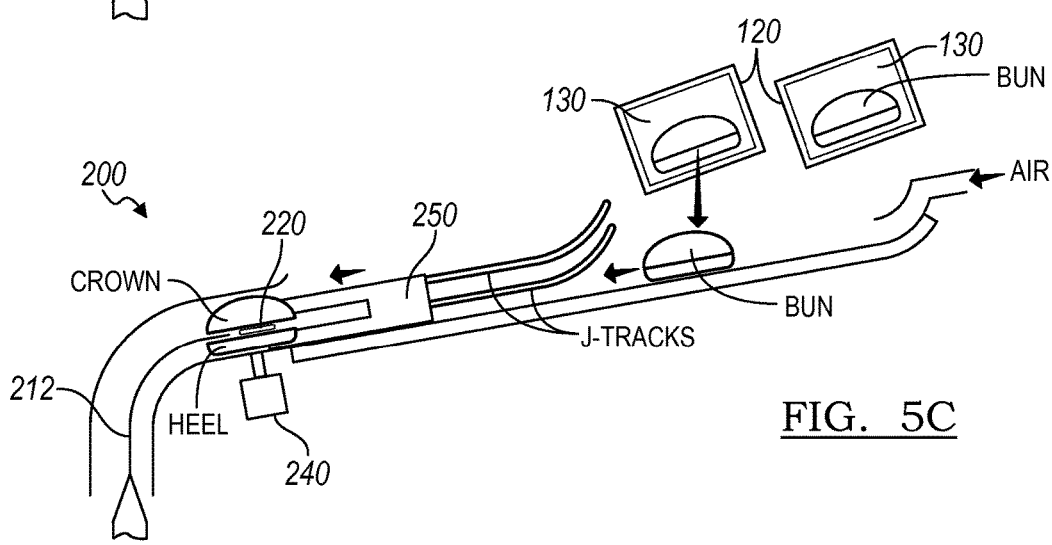

| Camshaft Angle (°) | 0 | 60 | 120 | 180 | 240 | 300 | 360 |
|---|---|---|---|---|---|---|---|
| Time | T1 | T2 | T3 | T4 | T5 | T6 | T7 |
| Slicing Mechanism 200 | -- | -- | -- | -- | release bun 4 | -- | -- |
| Butter Stage: compression | closed (compress bun 3) | closed (compress bun 3) | open | open | open (receive bun 4) | closed (compress bun 4) | closed (compress bun 4) |
| Butter Stage: gate | closed | open | open | closed | closed | closed | closed |
| Toast Stage: compression (1) | open | open | open (receive bun 3) | closed (compress bun 3) | closed (compress bun 3) | closed (compress bun 3) | open |
| Toast Stage: gate (1) | open (receive bun 2) | closed | closed | closed | closed | open | open (receive bun 3) |
| Toast Stage: compression (2) | closed (receive bun 2) | closed (compress bun 2) | closed (compress bun 2) | open | open | open | closed |
| Toast Stage: gate (2) | closed | closed | open | open (receive bun 2) | open (receive bun 2) | closed | closed |
| Toast Stage: compression (3) | closed (compress bun 1) | closed (compress bun 1) | open | closed | closed | closed | closed (compress bun 2) |
| Toast Stage: gate (3) | closed | open | open (release bun 1) | closed | -- | -- | -- |
| Boxing Subsystem 350 | -- | -- | receive bun 1, 100% toast | -- | -- | -- | -- |

FIG. 10A

| Camshaft Angle (°) | 0 | 60 | 90 | 120 | 180 | 240 | 300 | 360 |
|---|---|---|---|---|---|---|---|---|
| Time | T1 | T2 | T2.5 | T3 | T4 | T5 | T6 | T7 |
| Slicing Mechanism 200 | -- | -- | -- | -- | -- | release bun 4 | -- | -- |
| Butter Stage: compression 311A | closed (compress bun 3) | closed (compress bun 3) | closed (compress bun 3) | open | open | open (receive bun 4) | closed (compress bun 4) | closed (compress bun 4) |
| Butter Stage: gate 311B | closed | open | open | open | closed | closed | closed | closed |
| Toast Stage: compression 322A | open | open | open | open (receive bun 3) | closed (compress bun 3) | closed (compress bun 3) | closed (compress bun 3) | open |
| Toast Stage: gate 322B | open (receive bun 2) | closed | closed | closed | closed | closed | open | open (receive bun 3) |
| Toast Stage: compression 323A | open | closed (compress bun 2) | closed (compress bun 2) | closed (compress bun 2) | open | open | open | closed |
| Toast Stage: gate 323B | closed | closed | closed | open | open | open | closed | closed |
| Toast Stage: compression 324A | closed (compress bun 1) | closed (compress bun 1) | open | open | open (receive bun 2) | open (receive bun 2) | closed (compress bun 2) | closed (compress bun 2) |
| Toast Stage: gate 324B | closed | open | open (release bun 1) | open | closed | closed | closed | closed |
| Boxing Subsystem 350 | -- | -- | receive bun 1, 80% toast | -- | -- | -- | -- | -- |

FIG. 10B

SYSTEMS AND METHODS FOR DISPENSING, SLICING, BUTTERING, AND TOASTING BREAD

CROSS-REFERENCE TO RELATED APPLICATIONS

This application claims the benefit of U.S. Provisional Application No. 62/056,971, filed on 29 Sep. 2014, and U.S. Provisional Application No. 62/056,976, filed on 29 Sep. 2014, both of which are incorporated in their entireties by this reference.

TECHNICAL FIELD

This invention relates generally to the field of food preparation and more specifically to new and useful systems and methods for dispensing, slicing, buttering, and toasting bread.

BRIEF DESCRIPTION OF THE FIGURES

FIGS. 5A, 5B, and 5C are schematic representations of one variation of the second system;

FIGS. 10A and 10B are a graphical representations of variations of the third system;

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Bun Dispenser

Figure 1:
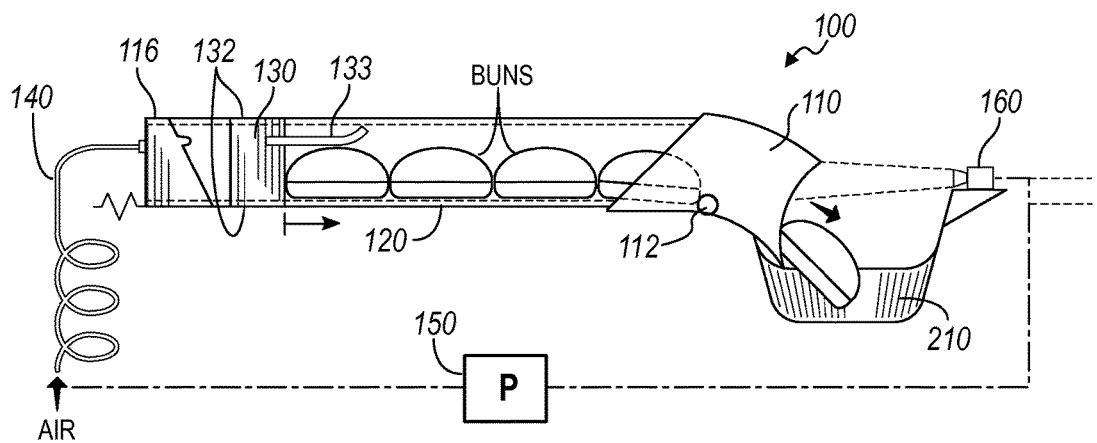
FIG. 1 is a representations of a first system.

As shown in FIG. 1, a first system 100 for dispensing bread buns into a bun slicing mechanism, includes: a receiver; a hopper 120 including a substantially transparent elongated housing configured to contain a row of whole bread buns, defining a discharge end configured to transiently engage the receiver 110 and to dispense whole bread buns into the receiver 110, and defining a pressurized end opposite the discharge end; a piston 130 arranged within the hopper 120 between the pressurized end of the hopper 120 and the row of whole bread buns; a permeable seal 132 interposed between an interior wall of the hopper 120 and an adjacent surface of the piston 130, the permeable seal 132 cooperating with the hopper 120 and the piston 130 to define a closed volume between the pressurized end of the hopper 120 and the piston 130, the permeable seal 132 configured to bleed gas from the closed volume toward the discharge end of the hopper 120; a gas supply 140 intermittently supplying gas into the closed volume to displace the piston 130 toward the discharge end of the hopper 120; and a roller 112 arranged between the hopper 120 and the receiver 110 and extending into a boundary defined by a cross-section of the hopper 120 projected toward the receiver 110 parallel to an axis of the hopper 120.

1.1 Applications

Generally, the first system 100 for dispensing bread buns (herein after "bun dispenser") functions to sequentially dispense whole bread buns stored in one or more hoppers into a slicing mechanism (shown in FIG. 4) prior to application of a dairy fat (e.g., butter) onto and toasting of sliced surfaces of bun crowns and bun heels. In particular, the bun dispenser can include a hopper 120, a piston 130 arranged within the hopper 120 behind a row of whole buns, and a gas supply 140 that intermittently pumps gas into a volume behind the piston 130 to advance the piston 130 forward, thereby driving whole buns out of the hopper 120 and into an adjacent slicing mechanism. The bun dispenser can therefore include a single moving component in contact with bread buns stored in the hopper 120, thereby minimizing complexity of the system, minimizing component wear, and maintaining relatively high cleanability of the system, etc.

The first system 100 can also include a sensor configured to detect a relative position of the row of whole buns in the hopper 120, and the bun dispenser can be configured to dispense a single bread bun per dispense cycle by implementing closed loop feedback to commence and cease supply of gas to the volume behind the piston 130 based on outputs of the sensor. In particular, rather than index the piston 130 to discrete, preset positions along the length of the hopper 120, the bun dispenser can advance and pause the piston 130 at any position along the length of the hopper 120 by controlling fluid pressure behind the piston 130. The bun dispenser can also include a permeable seal 132 interposed between the piston 130 and the interior wall of the hopper 120 and configured to bleed gas pressure from behind the piston 130 such that the piston 130 stops relatively quickly once the gas supply 140 is closed without necessitating active evacuation of gas from behind the piston 130 with a secondary pump and without necessitating actuation of a pressure release valve 141 fluidly coupled to the volume behind the piston 130. The hopper 120 can therefore be loaded with various types of whole buns of different geometries, and the bun dispenser can dispense a single bun per dispense cycle regardless of bun type loaded into the hopper 120 without necessitating selection of alternative preset piston 130 positions or physical modification of any subcomponent with the bun dispenser to accommodate for a different bread bun geometry. Similarly, the hopper 120 can be loaded with a row of a single type of whole bread bun exhibiting significant variations in bun width, height, mass, and/or texture, etc.—such as gourmet brioche buns that vary from 2.5" to 5" in diameter and from 2" to 3.5" in height—and the bun dispenser can implement closed-loop techniques to selectively open and close the gas supply 140 based on outputs of the sensor in order to advance the piston 130 until a bun is dispensed and to then stop the piston 130 before a second bun is dispensed from the hopper 120 in the same dispense cycle. Elements within the first system 100 can therefore cooperate to compensate for variations in geometry of buns of a single bread bun type loaded into the hopper 120.

The bun dispenser can define a subsystem within an automated foodstuff assembly system including one or more other subsystems that cooperate to automatically prepare, assemble, and deliver foodstuffs for and/or to consumers. For example, the automated foodstuff assembly system can include a patty grinding subsystem that grinds and presses custom hamburger patties from raw meat (e.g., based on custom patty orders), a patty grilling subsystem that grills patties (e.g., rare, medium, or well-done based on custom patty orders), a bun slicing mechanism that slices buns received from the bun dispenser (as described below), a bun buttering subsystem that applies butter to each side of sliced buns prior to toasting the sides of the bun (as described below), a bun toaster subsystem that toasts each side of the bun (as described below), a topping module that loads toppings onto bun heels (e.g., based on custom topping orders), and a boxing subsystem 350 that closes completed hamburgers into paper boxes for delivery to patrons. The bun dispenser can similarly deliver bread products for assembly into sandwiches, hotdogs, burritos, tacos, wraps, or other foodstuffs, such as according to custom food orders. The bun dispenser can therefore be incorporated into an automated foodstuff assembly system to store and then dispense a fresh, whole, and/or locally-sourced bread bun into a slicing mechanism only one an order for a foodstuff is submitted and as the foodstuff is being fulfilled.

Figure 2:
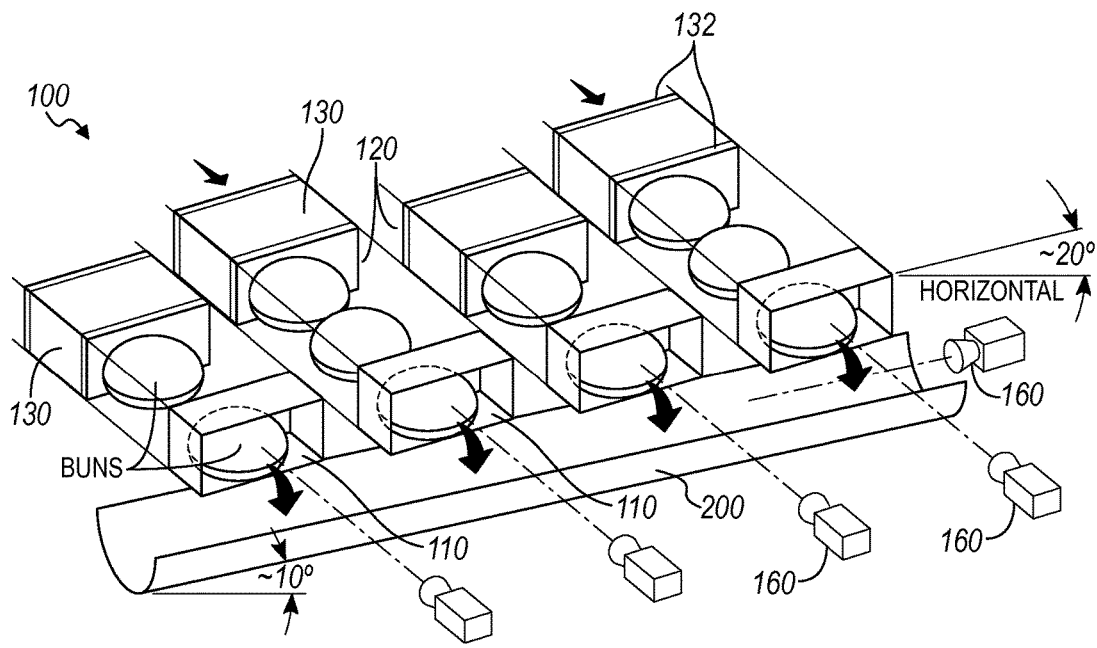
FIG. 2 is a schematic representations of one variation of the first system.
Figure 4:
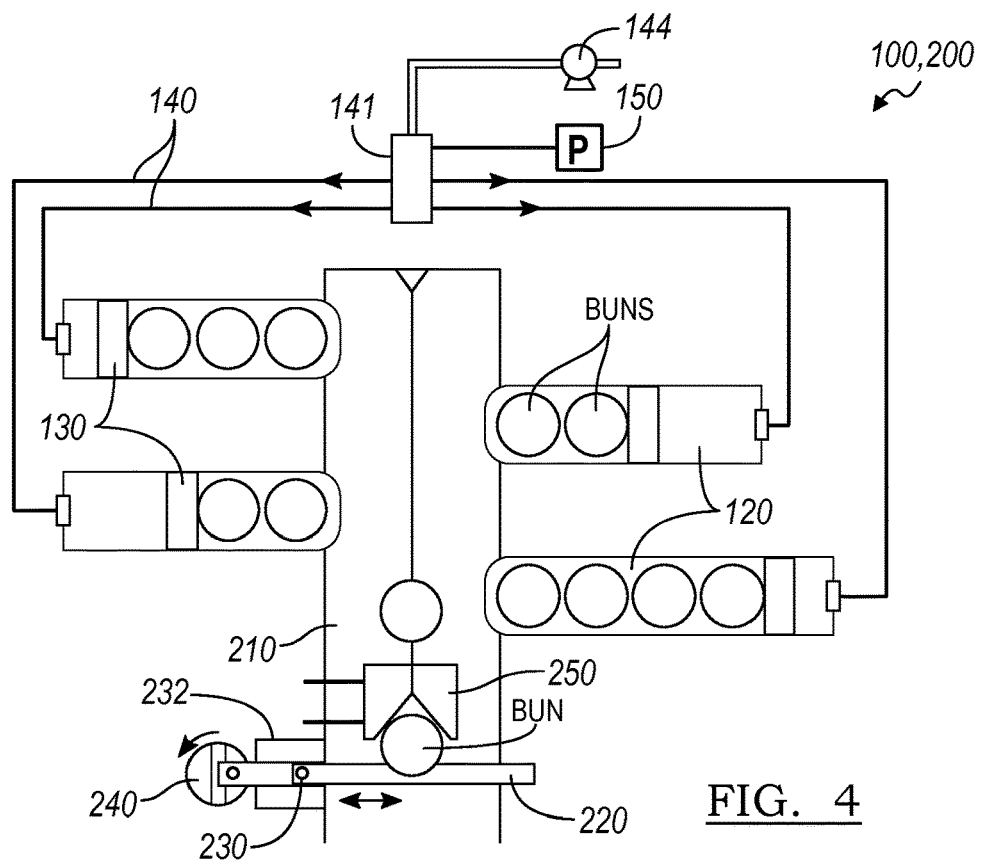
FIG. 4 is a schematic plan representations of a second system and one variation of the first system.

The bun dispenser can include a substantially transparent section containing fresh buns and a minimum of moving components such that the buns are visible to patrons near the automated foodstuff assembly system substantially without visual obstruction, such that a number of (moving) components and materials near and in contact with whole bread buns during operation of the bun dispenser is substantially limited, and/or such that the components of the bun dispenser remain substantially simple and straightforward to disassemble and to clean (e.g., by a human operator). The bun dispenser can further include multiple receivers and multiple hoppers, each configured to store multiple buns and installed in a corresponding receiver, and the bun dispenser can include a processor 150 configured to interface with one or more gas supplies, valves, reservoirs, and/or pumps, etc. to sequentially, intermittently, and cyclically dispense buns from the hopper 120(s) into a single slicing mechanism, as shown in FIGS. 2 and 4 and described below.

The bun dispenser is described herein as a system for dispensing hamburger buns, such as whole gourmet brioche buns. However, the bun dispenser can additionally or alternatively dispense bread loaves, hot dog buns, rolls, bagels, or any other suitable bread or grain product of any other form or format. The slicing mechanism (or "bun slicer") can similarly slice bread loaves, hot dog buns, rolls, or any other suitable bread product of any other form or format.

1.2 Receiver

The bun dispenser includes a receiver 110 arranged over a bun slicing mechanism and/or over a buttering and toasting system within the automated foodstuff assembly apparatus and functions to receive buns dispensed from the discharge end of a connected hopper 120. The receiver 110 can receive a hopper 120, transiently retain the hopper 120 in place, release the hopper 120 once emptied, and then receive a second, full hopper 120 filled with a row of whole bread buns. For example, the receiver 110 can include a (manually- or automatically-actuated) lock or latch that engages the hopper 120 to constrain the hopper 120 in alignment over an adjacent slicing mechanism. The receiver 110 can also include one or more features that locate the discharge end of the hopper 120, such as vertically and horizontally, with a long axis of the hopper 120 parallel to an inlet of the receiver 110, and the receiver 110 can define an internal cross-section of sufficient size and geometry to receive whole bread buns from the hopper 120 and to guide whole bread buns into the slicing mechanism and/or toaster below.

In one variation, the bun dispenser also includes a receptacle 116 offset from the receiver 110, fluidly coupled to the gas supply 140, configured to transiently receive and to seal against the pressurized end of the hopper 120, and configured to cooperate with the receiver 110 to transiently support the hopper 120. In this variation, the receptacle 116 can be arranged in-line with and longitudinally offset from the receiver 110, as shown in FIG. 1, and the receptacle 116 can lock and/or engages the pressurized end of the hopper 120, thereby cooperating with the receiver 110 to transiently constrain the hopper 120 in position during dispensation of buns from the hopper 120. In one example, the receptacle 116 (and/or the receiver 110) is spring loaded and can be retracted longitudinally away from the receiver 110—such as manually by an operator—to release the hopper 120 once emptied of buns; the receptacle 116 can be similarly retracted to accept a second hopper loaded with buns. In this example, the receptacle 116 can be released, and a spring or damper coupled to the receptacle 116 can drive the receptacle 116 into a pressurized end of the second hopper to retain the second hopper in place in preparation for dispensation of buns from the second hopper, as described below.

However, the bun dispenser can include a receiver and/or a receptacle 116 of any other form or geometry and configured to transiently (i.e., removably) support hoppers in any other suitable way.

1.3 Hopper

The bun dispenser includes a hopper 120 including a substantially transparent elongated housing configured to contain a row of whole bread buns, defining a discharge end configured to transiently engage the receiver 110 and to dispense whole bread buns into the receiver 110, and defining a pressurized end opposite the discharge end. Generally, the hopper 120 functions as a container for storing a row of whole bread buns and dispenses buns, through its discharge end, into the receiver 110 as the piston 130 is driven longitudinally through the hopper 120 toward the receiver 110. As described above, the hopper 120 can be transiently (i.e., removably) coupled to the receiver 110 and can therefore be removed and replaced with a second, full hopper 120 loaded with a second row of buns while the (first) hopper 120 is replenished with buns.

The hopper 120 can be of a length suitable to contain multiple whole bread buns in a row (i.e., a "full" hopper 120). For example, the hopper 120 can be approximately four feet in length, which may sufficient to hold at least ten buns averaging four inches in diameter (with some deviation in diameter and height) when the buns are arranged side by side in a row within the hopper 120. Alternatively, the hopper 120 can store multiple buns in a stack with the heel of one bun in arranged over (or under) a crown of an adjacent bun. However, the hopper 120 can store any other number of buns in any other arrangement.

The hopper 120 can define a rectilinear, curvilinear, circular, or elliptical cross-section or a cross-section of any other suitable form to accommodate one or more types of whole bread buns, such as sufficient to accommodate a particular type of bun characterized by relatively high variability (e.g., 50%) in diameter, height, and/or shape. However, the hopper 120 can define an internal cross-section of any other form suitable to accommodate a set of buns arranged in a row, stack, or other format.

In one implementation, the hopper 120 defines a rectangular internal cross-section and stores buns arranged side by side in a row. In this implementation, the receiver 110 (and the receptacle 116) can support the hopper 120 such that the longitudinal axis of the hopper 120 is substantially parallel to the ground but such that the bottom (planar) surface of the hopper 120 is held at an angle to the horizon (i.e., nonparallel to gravity), such as at an angle of 20°, as shown in FIG. 2. In one example, the hopper 120 can define a first planar surface (e.g., a side) and a second planar surface (e.g., a bottom) substantially perpendicular to the first planar surface, wherein the first planar (surface extends from the pressurized end to the discharge end and is configured to support a vertical side of each whole bread bun in the row of whole bread buns, and wherein the second planar surface extends from the pressurized end to the discharge end and is configured to support a bottom side of each bun in the row of whole bread buns. In this example, the receiver 110 can support the hopper 120 with the first planar surface of the hopper 120 at an angle of approximately 45° to gravity. In this example, buns contained in the hopper 120 can be drawn into a lowest corner of the hopper 120 defined by the first and second planar surfaces by gravity. The first and second planar surfaces can therefore cooperate to locate buns in a reference corner of the hopper 120; thus, as the piston 130 is advanced forward toward the discharge end of the hopper 120 to dispense a whole bread bun from the hopper 120, gravity can maintain buns substantially in alignment in the hopper 120.

In the foregoing implementation, the heel of each whole bun stored in the hopper 120 can rest on bottom surface of the hopper 120, and a side of each bun stored in the hopper 120 can rest—due to gravity—on a side of the hopper 120 perpendicular to the bottom surface of the hopper 120, as shown in FIG. 2. The receiver 110 can therefore orient the hopper 120 such that the bottom surface of the hopper 120 and an adjacent (e.g., perpendicular) side of the hopper 120 constrains buns contained therein in two degrees of translation, thereby substantially reducing opportunity for buns stored in the hopper 120 to pack or "bunch" within the hopper 120 as the piston 130 drives the row buns toward the receiver 110.

As described above, the hopper 120 can include a transparent section to enable an operator, a patron, and/or a sensor to visually (or optically) detect a status of the row of buns contained in the hopper 120, such as what type and number of buns currently stored in the hopper 120. For example, the hopper 120 can include a glass (e.g., borosilicate) or polymer (e.g., acrylic, polycarbonate) tube: open at the discharge end; including features proximal the discharge end that engage the receiver 110; open at the pressurized end; and including features proximal the discharge that engage the receptacle 116. In the variation of the system that includes a receptacle 116, as described above: the receptacle 116 can close and seal against the pressurized end of the hopper 120 when the hopper 120 is installed in the automated foodstuff assembly apparatus; and the gas supply 140 can be (intransiently) connected directly to the receptacle 116 and can release gas into the hopper 120 through the receptacle 116 when the hopper 120 is installed in the automated foodstuff assembly apparatus. Alternatively, the hopper 120 can be closed at the pressurized end of the tube, and the gas supply 140 can connect directly to the hopper 120 at the pressurized end, such as with a quick-disconnect coupler.

The hopper 120 can further include perforations along its bottom and/or along one or more adjacent sides, such as relatively small (e.g., 500-micron-diameter) perforations along the first planar surface and/or along the second planar surface of the hopper 120 described above, and the bun dispenser can include a second gas supply that supplies gas to a chamber(s) behind these perforations in the hopper 120 when the hopper 120 is installed in the receiver 110. In this implementation, the perforations can bleed gas from the chamber to form a cushion of gas under buns stored in the hopper 120, thereby reducing stiction between buns and adjacent surfaces in the hopper 120 and/or reducing opportunity for buns to stick to interior surfaces hopper 120. In this variation, the second gas supply can supply nitrogen, argon, or an other inert gas to the hopper 120 to maintain freshness of buns stored therein. Alternatively, the second gas supply can supply heated and/or humidified air or steam to the hopper 120 in order to preserve a target moisture content and/or temperature of the buns stored in the hopper 120. Yet alternatively, the second gas supply can supply heated or cooled air or carbon dioxide or any other suitable (food-safe) gas to the hopper 120 via The hopper 120 can further include a handle—or an engagement feature that accepts a handle—that enables an operator to grasp the hopper 120 when transported to and from the receiver 110. For example, an operator tasked with maintaining an automated foodstuff assembly apparatus including the bun dispenser can: installed a removable handle onto the hopper 120 once the hopper 120 is emptied; remove the hopper 120 from the receiver 110; load the hopper 120 with whole fresh bread buns from a local supplier; return the hopper 120 to the receiver 110; and then release the handle from the hopper 120 to complete installation of the hopper 120 into the receiver 110. In this example, the bun dispenser can include a second receiver, a second hopper, and a second piston 130—as described below—that dispenses buns from a second column of buns while the (first) hopper 120 is removed from the bun dispenser for reloading.

1.4 Piston and Seal

The bun dispenser includes a piston 130 arranged within the hopper 120 between the pressurized end of the hopper 120 and the row of whole bread buns. Generally, the piston 130 translates longitudinally within the hopper 120 to displace a row (or a stack) of buns toward the receiver 110, thereby dispensing buns from the hopper 120. In particular, the gas supply 140 supplies gas at an elevated pressure (i.e., a pressure exceeding local atmospheric pressure) to the closed volume behind the piston 130 to displace the piston 130 forward toward the receiver 110. Therefore, the piston 130 (in-unit with the permeable seal 132) can define the single moving component within the bun dispenser that dispenses buns into the slicing mechanism.

The bun dispenser also includes a permeable seal 132 interposed between an interior wall of the hopper 120 and an adjacent surface of the piston 130, wherein the permeable seal 132 cooperates with the hopper 120 and the piston 130 to define a closed volume between the pressurized end of the hopper 120 and the piston 130, and wherein the permeable seal 132 is configured to bleed gas from the closed volume toward the discharge end of the hopper 120. Generally, the permeable seal 132 functions to form an incomplete (e.g., "loose") seal between the piston 130 and the interior wall of the hopper 120 such that fluid pressure in the closed volume behind the piston 130 bleeds through (or past) the seal, thereby enabling the closed volume return to (near) local atmospheric pressure when the gas supply 140 is closed (e.g., without opening a pop-off valve 143 or actively pumping gas out of the closed volume with a second pump fluidly coupled to the closed volume).

In one implementation, the piston 130 includes a substantially rigid mass defining a first end facing the pressurized end of the hopper 120, defining a second end facing the dispense end of the hopper 120, and defining an external dimension (e.g., cross section) undersized for the internal cross-section of the hopper 120. In one example, the permeable seal 132 includes a first perforated polymer seal arranged about the circumference of the piston 130 adjacent the first end of the piston 130 and a second perforated polymer seal arranged about the circumference of the piston 130 adjacent the second end of the piston 130. In this example, the first perforated polymer seal can include a closed-cell silicone-foam ring with perforations extending through the ring substantially parallel to the long axis of the hopper 120. The second polymer seal can include a similar closed-foam silicone ring and can cooperate with the first perforated polymer seal to bleed gas from the first end of the piston 130 to the second end of the piston 130. In another example, the permeable seal 132 includes a felt seal arranged about the perimeter of the piston 130 and sized to engage the internal surface of hopper 120 according to a running fit. In yet another example, the permeable seal 132 includes an food-safe open-celled foam. However, the bun dispenser can include a seal of any other suitable material, geometry, or arrangement on the piston 130.

The permeable seal 132 can thus allow gas pressure to build behind the piston 130 when gas is released from the gas supply 140 into the hopper 120 but can also allow gas to seep past the piston 130 such that gas pressure on each side of the piston 130 may relatively quickly equilibrate once the gas supply 140 is closed to the hopper 120. In particular, because the permeable seal 132 gas permit gas may leak past the piston 130, the piston 130 may stop substantially immediately when the gas supply 140 is closed, thereby enabling substantially accurate cessation of bun row advancement once a bun is dispensed from the hopper 120 during a dispense cycle by merely closing the gas supply 140 with a dispense event is detected. The bun dispenser can therefore exclude one or more sensors that may otherwise be sampled to monitor gas pressure behind the piston 130 and/or to monitor a volume of gas released into the hopper 120 to displace the piston 130 toward the receiver 110. For example, the bun dispenser can exclude both a pressure sensor arranged within or coupled to the hopper 120 can configured to detect gas pressure inside the hopper 120 and a flow meter coupled to the gas supply 140 to detect quantities of gas pumped into the hopper 120.

Alternatively, the piston 130 can be sealed to the hopper 120 with an impermeable seal 132ed (e.g., a pair of solid (i.e., unperforated) silicone O-rings), and the piston 130 can include one or more bores (of substantially small cross-sectional area) configured to bleed gas from behind the piston 130 toward the receiver 110. In particular, the piston 130 can include multiple bores of substantially small cross-section such that gas pressure can build behind the piston 130 when the gas supply 140 is opened but such that gas can seep past the piston 130 passively to enable gas pressure on each side of the piston 130 to equilibrate relatively quickly—thereby enabling the piston 130 to slow to a stop inside the hopper 120 relatively quickly—once the gas supply 140 is closed (e.g., in response to detection of a dispense event), as described above. However, the bun dispenser can include a piston 130 and/or a permeable sea configured to bleed gas pressure through and/or across the piston 130 in any other suitable way.

In one example, the piston 130 includes a substrate of solid hardwood, such as carved or machined walnut or cherry. Alternatively, the piston 130 can include a metallic substrate, such as cast aluminum or machined steel, or a polymer substrate, such as injection-molded nylon or cast polycarbonate. The piston 130 can also be sized (or undersized) to mate with the interior wall of the hopper 120. For example, for a hopper 120 defining a rectangular cross-section 6" wide and 4" tall, the piston 130 can define a rectilinear substrate 50.8" wide and 30.8" tall. In this example, the permeable seal 132 can include a first perforated polymer seal and a second perforated polymer seal, each 0.12" in height and configured to crush to 0.1" in height between the piston 130 and the interior wall of the hopper 120 when installed about the circumference of the first end and the second end, respectively, of the hopper 120. However, the piston 130 can be of any other suitable material or geometry.

Figure 3:
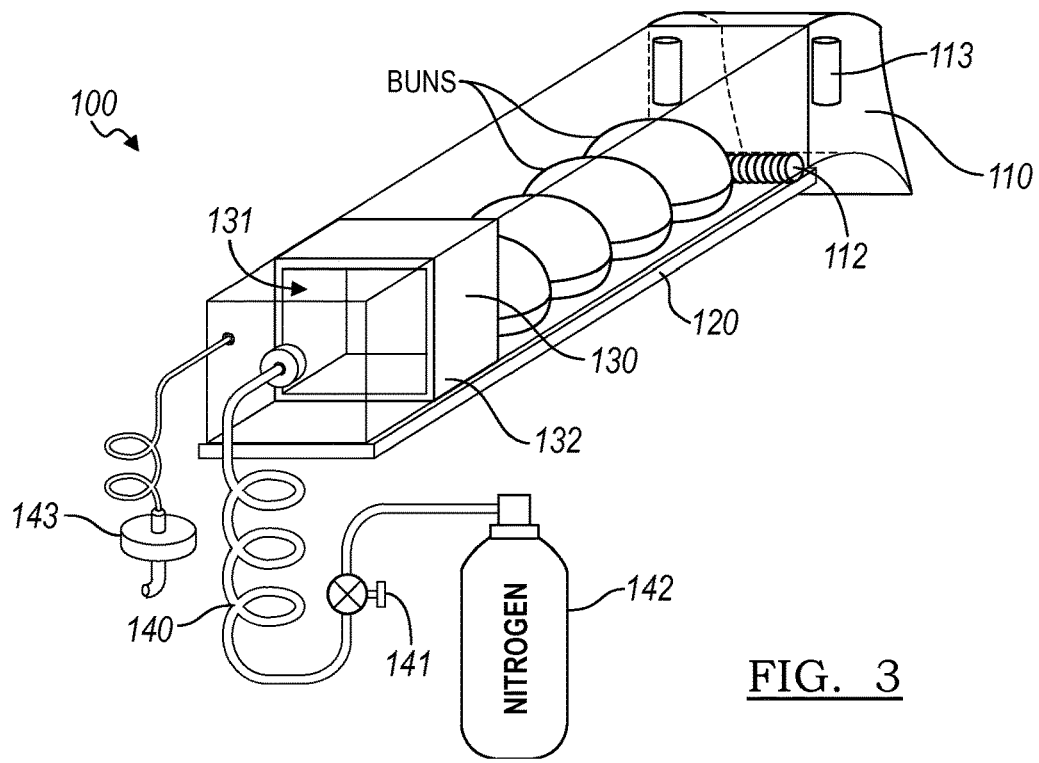
FIG. 3 is a schematic representations of one variation of the first system.

The rear of the piston 130 can further define a well 131, as shown in FIG. 3, such that gas under pressure behind the piston 130 acts on the piston 130 substantially near the leading face of the piston 130 to advance the piston 130 toward the receiver 110, which may substantially limit a tendency of the piston 130 to pitch within the hopper 120. The piston 130 can also include a tongue 133 extending toward the discharge end of the hopper 120 and over a crown of a whole bread bun, in the row of whole bread buns, adjacent the piston 130, as shown in FIG. 1. Generally, the tongue 133 can function to constrain the bottom surface of the last bun in the row of buns (i.e., the bun adjacent the piston 130) against the bottom surface (e.g., the second planar surface) of the hopper 120. In particular, the tongue 133 can prevent the last bun the row of buns from pitching relatively to the hopper 120 as the piston 130 is advanced forward along the hopper 120 and pushes the row of buns toward the receiver 110. In one example, the tongue 133 includes a static, cantilevered beam extending outwardly from the second end of the piston 130 at a height about the bottom surface of the hopper 120 (e.g., the second planar surface of the hopper 120) by a distance approximating an average (or allowable maximum) height of the type of whole bread bun loaded into the hopper 120. In another example, the tongue 133 include a substantially rigid beam extending from the second of the hopper 120 and sprung downward toward the bottom of the hopper 120. In this example, the tongue 133 can then be spring downward toward and can rest on the top of the last bun in the row of buns stored in the hopper 120. Furthermore, in this example, the tongue 133 can include a stop that prevents the tongue 133 from pivoting (or translating) upwardly away from the bottom surface of the hopper 120 by more than the allowable maximum height of the type of whole bread bun loaded into the hopper 120.

In one implementation, the piston 130 is unique to (i.e., remain with) the hopper 120. In particular, the piston 130 can remain with the hopper 120 when the hopper 120 is both installed in the automated foodstuff assembly apparatus to dispense buns into the slicing mechanism and removed from the automated foodstuff assembly apparatus, such as for reloading with buns. For example, the hopper 120 can define features at each open end to prevent the piston 130 from passing fully through the hopper 120, such as when the piston 130 moves fully toward the receiver no once the last bun is dispensed from the hopper 120 or when the piston 130 is retracted toward the pressurized end of the hopper 120 in preparation for reloading the spent hopper 120 with more buns. In this example, these features that capture the piston 130 within the hopper 120 can also be operable to release the piston 130 from the hopper 120, such as by an operator in preparation for separately cleaning the hopper 120 and the piston 130.

Alternatively, the piston 130 can remain with the automated foodstuff assembly apparatus when the emptied hopper 120 is removed from the automated foodstuff assembly apparatus and replaced with a full hopper 120. For example, upon dispensation of a last bun from the hopper 120, gas (e.g., air) can be withdrawn from the hopper 120 between the trailing face of the piston 130 and the pressurized end of the hopper 120—such as through the gas supply 140 or through a gas return line coupled to the hopper 120—to yield a partial vacuum within the hopper 120. In this example, the partial vacuum can draw the piston 130 back toward the pressurized end of the hopper 120 and fully into the receptacle 116 adjacent the pressurized end of the hopper 120. The hopper 120 can then be removed from the apparatus sans the piston 130, a full hopper 120 filled with buns can be installed in the apparatus, and the piston 130 can then be moved forward into the full hopper 120 by introducing as under pressure into the full hopper 120 to displace buns toward and into the receiver 110.

1.5 Gas Supply

The bun dispenser includes a gas supply 140 configured to intermittently supply gas into the closed volume to displace the piston 130 toward the discharge end of the hopper 120. Generally, the gas supply 140 functions to supply gas under pressure to the hopper 120 behind the piston 130 to displace the piston 130 toward the receiver 110 during a dispense cycle, thereby dispensing a bun from the hopper 120 into the receiver 110, which then releases the bun into the slicing mechanism for subsequent slicing into a bun crown and a bun heel.

In one implementation, the gas supply 140 is connected substantially intransiently to the receptacle 116 opposite the receiver 110 and includes a flexible line that absorbs movement of the receptacle 116, such as when the receptacle 116 is retracted during removal of a spent hopper 120 and when the receptacle 116 is retracted during installation of a full hopper 120. Alternatively, the gas supply 140 can be transiently connected directly to the hopper 120, such as with a quick disconnect coupler such that the gas supply 140 can be quickly connected and disconnected from each new hopper 120 installed in the receiver 110.

The gas supply 140 can includes a reservoir 142, a pump 144, a gas generator, and/or any other suitable type of gas pressure device arranged in the automated foodstuff assembly apparatus and configured to output pressurized gas, such as air, argon, or nitrogen at pressures exceeding local ambient air pressure. Alternatively, the gas supply 140 can couple the hopper 120 (or the receptacle 116) to an external pressurized gas line that supplies gas to the automated foodstuff assembly apparatus. The gas supply 140 can additionally or alternatively include a valve 141 (shown in FIG. 3) arranged between a gas pressure device and the hopper 120, such as a solenoid valve 141.

As described above, the gas supply 140 functions to supply gas to the hopper 120 to increase fluid pressure behind the piston 130, which in turn displaces the piston 130 toward the discharge end of the hopper 120. However, a weak or loose seal between the hopper 120 and the piston 130 may allow gas to seep passed the piston 130 such that gas pressure on each side of the piston 130 may to equalize relatively quickly, thereby stopping the piston 130 stop relatively abruptly when the gas supply 140 is closed (e.g., when the valve 141 is closed, when the gas pressure device is deactivated). The bun dispenser can therefore close the gas supply 140 in response to detected dispensation of a bun through the receiver 110, and the permeable seal 132 between the piston 130 and the hopper 120 (and/or a bore passing through the piston 130) bleed gas across the piston 130 such as fluid pressure equilibrates on each side of the piston 130, thereby enabling substantially precise (i.e., accurate and repeatable) position control of the piston 130 without necessitating close monitoring of the gas pressure within the hopper 120 and without monitoring a volume of gas pumped into the hopper 120 behind the piston 130.

Furthermore, because the permeable seal 132 may bleed gas from behind the piston 130 into the volume of the hopper 120 containing buns, the gas supply 140 can supply a particular type and/or quality of gas supplied to the closed volume behind the piston 130. For example, the gas supply 140 can release an inert gas (e.g., argon, nitrogen) from a pressurized inert gas reservoir 142 into the closed volume behind the piston 130. Alternatively, the gas supply 140 can include a pump 144 and a humidifier that cooperate to supply humidified air into the hopper 120, such as to maintain a target moisture content of the row of buns.

In one implementation, the gas supply 140 includes a pop-off valve 143 fluidly coupled to the pressurized end of the hopper 120, such as in addition to or in replacement of the permeable seal 132. In this implementation, the bun dispenser can open the pop-off valve 143 in response to detection of a dispense event (i.e., in response to release of a whole bread bun, in the row of whole bread buns, into the receiver no) during a dispense cycle. The bun dispenser can therefore actively release fluid pressure behind the piston 130 by actuating the pop-off valve 143. The pop-off valve 143 can be fluidly connected to the gas supply 140, such as between a solenoid valve 141 and the hopper 120. Alternatively, gas supply 140 can include a valve 141 that selectively opens the hopper 120 to a pressure reservoir 142 or other gas pressure device and to ambient; the valve 141 in the gas supply 140 can thus function as a pop-off valve 143.

However, the bun dispenser can manipulate fluid pressure behind the piston 130 in any other suitable way.

1.6 Sensors

In one variation, the bun dispenser includes one or more sensors that output signals corresponding to the position of the row of buns in the hopper 120 and/or to dispensation of a bun into the slicing mechanism.

In one implementation, the bun dispenser includes a distance sensor 160 aligned with the axis of the hopper 120 opposite the receiver no and configured to output a signal proportional to a distance between the distance sensor 160 and a surface of a nearest whole bread bun in the row of whole bread buns arranged in the hopper 120. For example, the distance sensor 160 can include an optical (e.g., laser) or acoustic (e.g., sonar) distance sensor 160 offset from the receiver 110 ahead of the hopper 120 and defining a field of view extending from the dispense end of the hopper 120 toward the pressurized end of the hopper 120. The bun dispenser can thus sample the distance sensor 160 to determine a position—in the hopper 120—of a whole bread bun approaching the receiver 110.

The bun dispenser can also include a mechanical contact switch, optical break switch, or any other suitable type of switch or sensor proximal the dispense end of the hopper 120, such as within or across an outlet of the receiver 110. The bun dispenser can sample the switch to identify a dispense event, such as in addition to sampling the distance sensor 160 to achieve sensor redundancy in the system. However, the bun dispenser can include any other number and/or type of sensor configured to output a signal corresponding to a position of a bun in the system.

1.7 Roller

The bun dispenser can also include a roller 112 proximal an outlet of the receiver 110 between the receiver 110 and the slicing mechanism. In this variation, the roller 112 can function as a soft or rolling stop for whole buns passing into the receiver 110 to prevent multiple buns from dropping into the slicing mechanism below as the piston 130 slows within the hopper 120 once a whole bread bun has been dispensed and once the gas supply 140 has been closed. In one implementation, the roller 112 is arranged between the hopper 120 and the receiver 110 and extends into a boundary defined by a cross-section of the hopper 120 projected toward the receiver 110 parallel to an axis of the hopper 120.

In the implementation described above in which the hopper 120 defines a rectangular cross section including a first planar surface (e.g., a side) and a second planar surface (e.g., a bottom), the roller 112 can be interposed between hopper 120 and the receiver 110 with an axis of the roller 112 parallel to (e.g., offset below, offset above, or aligned with) the second planar surface (e.g., the bottom) of the hopper 120. The roller 112 can include a cylindrical roller supported on bearings or bushings and can define a rolling surface that extends into the dispense end of the hopper 120. The roller 112 can thus impede a row of buns remaining in the hopper 120 from continuing to move into the receiver 110 following a dispense event. However, the roller 112 can rotate across the bottom of a bun as the row of buns is actively driven toward the dispense end of the hopper 120 by the piston 130 in order to mitigate physical damage to a bun forced past the roller 112 during a dispense cycle.

The bun dispenser can also include a second roller 113 that similarly defines a second rotational axis parallel to the second planar surface (e.g., the side) of the hopper 120 and that defines a second rolling surface offset from the second planar surface toward the axis of the hopper 120. The second roller 113 can rotate across the side of a first bun in the row of buns as the row of buns is actively driven toward the dispense end of the hopper 120 by the piston 130, and the second roller 113 can cooperate with the (first) roller 112 to impede a row of buns remaining in the hopper 120 from continuing to move into the receiver 110 once the first bun is dispensed into the receiver 110.

The bun dispenser can additionally or alternatively include a flap extending into a path of the row of buns and similarly functioning to inhibit release of a whole bread bun, in the row of whole bread buns, into the receiver 110. For example, the flap can include a silicone-foam flap or a spring-loaded rigid beam coupled to an inlet of the receiver no and extending from proximal the first planar surface (e.g., the side) of the hopper 120 and toward the long axis of the hopper 120 in an initial position. The flap can deflect away from the pressurized end of the hopper 120 as a first bun is actively driven past the flap and through the receiver no, but the flap can return to the initial position to inhibit advancement of a second bun behind the first bun once the first bun is dispensed from the hopper 120, the gas supply 140 is closed, and the piston 130 has ceased advancement within the hopper 120.

1.7 Dispensing Operation

Generally, the bun dispenser selectively opens the gas supply 140 to the hopper 120 during each dispense cycle to pressurize the closed volume between the piston 130 and the pressurized end of the hopper 120. During a dispense cycle, gas under pressure in the closed volume acts on the piston 130, thereby displacing the piston 130 toward the discharge end of the hopper 120, which displaces the row of whole bread buns toward the receiver no. Once a dispense event is detected (i.e., once a single bread bun is released into the receiver no), the bun dispenser closed the gas supply 140 to cease advancement of the piston 130 and to cease advancement of buns into the receiver 110.

In one implementation, the bun dispenser selectively actuates a gas generator (e.g., a nitrogen generator) or a pump 144 coupled to the hopper 120 to intermittently pressurize the closed volume behind the piston 130. Alternatively, the bun dispenser can trigger a valve 141 arranged between the hopper 120 and a reservoir 142 containing gas under pressure (e.g., arranged within or external to the automated foodstuff assembly system) to selectively release gas from the reservoir 142 into the hopper 120. The bun dispenser can also selectively actuate a humidifier in-line with the gas supply 140 to control a moisture content of gas (e.g., air) release into the hopper 120.

In one implementation, the bun dispenser opens gas supply 140 (e.g., opens a valve 141, actuates a pump 144, etc. to release a preset volume (or mass) of gas into the closed volume behind the piston 130. In this implementation, the bun dispenser can set or select the preset volume of gas to achieve a target displacement distance of the piston 130 toward the discharge end of the hopper 120 corresponding to a minimum or average diameter of a type of bread bun loaded into the hopper 120. In this variation, bun dispenser can release a constant, initial volume of gas into the hopper 120 for each dispense cycle. For example, the bun dispenser can open the gas supply 140 (e.g., trigger a valve 141 to open) for a preset period of time, such as two seconds, corresponding to the initial volume of gas to advance the piston 130 forward by the target distance for each dispense cycle. Alternatively, the bun dispenser can release present volumes of gas that are unique to each indexed position of the piston 130 for each subsequent dispense cycle as buns in the row of buns are sequentially released into the receiver 110. For example, the bun dispenser can: open the gas supply 140 for 1.0 second to release thirty cubic inches of gas into the hopper 120, thereby displacing the piston 130 forward by a distance sufficient to release a first bun I the row of buns into the receiver 110; then open the gas supply 140 for 1.2 seconds to release thirty-six cubic inches of gas into the hopper 120, thereby advancing the piton forward by a distance sufficient to release a second bun—previously behind the first bun—into the receiver 110; and then open the gas supply 140 for 1.6 seconds to release forty-eight cubic inches of gas into the hopper 120, thereby displacing the piston 130 by a distance sufficient to dispense a third bun—previously behind the second bun—into the receiver 110.

Alternatively, the bun dispenser can implement a hysteresis controller 112 to selectively open and close the gas supply 140 during a dispense cycle based on a signal output by a sensor coupled to the receiver 110 and corresponding to passage of a bun through the receiver 110. In one example, the bun dispenser includes an optical emitter outputting a light beam across the receiver 110 and offset ahead of the roller 112 by a distance corresponding to a tipping point at which buns that have passed the roller 112 fall (typically)

through outlet of the receiver 110. (Similarly, the optical emitter can output a light beam offset ahead of the roller 112 by a distance corresponding to a tipping point less a typical distance displaced by the piston 130 after the gas supply 140 is closed.) In this example, the bun dispenser also includes an optical detector pointing toward the optical emitter opposite the internal section of the receiver 110. In this example, while gas is flowed through the gas supply 140 into the hopper 120, the bun dispenser can sample an output of the optical detector during a dispense cycle to detect when a bun has passed the tipping point, and the bun dispenser can close the gas supply 140 when the beam output from the optical emitter to the optical detector is broken (i.e., by a bun), thereby ceasing flow of gas into the closed volume behind the piston 130, ceasing motion of the piston 130 toward the discharge end of the hopper 120, and ceasing release of additional buns into the receiver no for the dispense cycle. In a similar example, the bun dispenser can include a mechanical contact sensor inline with a path of buns dispensed from the hopper 120 into the receiver no or in line with the path of buns dispensed from the receiver 110 into the slicing mechanism. In this example, once the gas supply 140 is opened, the bun dispenser can sample an output of the sensor during a dispense cycle and can then close the gas supply 140 to cease delivery of gas to the hopper 120 in response to a change in the output state of the sensor (e.g., in response to contact by a bun).

Yet alternatively, the bun dispenser can implement closed-loop feedback to selectively open and close open the gas supply 140 during a dispense cycle based on an output of one or more sensors coupled to the receiver 110. For example, the bun dispenser can include a distance sensor 160 coupled to the receiver no opposite a chute 210 within the slicing mechanism, aligned with the hopper 120, and facing the piston 130, as described above, and the bun dispenser can sample the sensor can selectively open and close the valve 141 based on a output of the distance sensor 160 (e.g., based on a distance between the distance sensor 160 and a bun—in the row of buns—nearest the receiver no). In this example, during a dispense cycle, the bun dispenser can intermittently open the gas supply 140 (e.g., a valve 141) at a duty cycle proportional to a signal output by the distance sensor 160. In particular, the bun dispenser can open the gas supply 140 at an initial duty cycle at the beginning of a dispense cycle and reduce this duty cycle as a signal output by the sensor during the dispense cycle indicates that a first bun in the row of buns is nearing the sensor. For example, the gas supply 140 can supply gas to the closed volume behind the piston 130 at a first aggregate volume flow rate based on a first distance value output from the distance sensor 160, and the gas supply 140 can supply gas to the closed volume at a second aggregate volume flow rate less than the first aggregate volume flow rate based on a second distance value output from the distance sensor 160, the second distance value less than the first distance value. The gas supply 140 can thus supply a greatest flow rate of gas to the closed volume behind the piston 130 at the beginning of the dispense cycle and can supply gas at a flow rate that decreases as a bun nearest the receiver 110 (i.e., a "first bun") approaches a tipping point in the receiver 110.

Furthermore, the distance sensor 160 can output a signal characterized by a (near-) step change at an instant that a second bun—behind the first bun—comes into the field of view the sensor when the first bun is released from the receiver 110 into the adjacent slicing mechanism. The bun dispenser can thus detect (or confirm) a dispense event in response to receipt of such a step change in the output of the distance sensor 160, and the bun dispenser can close the gas supply 140 in response to this (near-) step change in distance values output by the distance sensor 160 during a dispense cycle.

The bun dispenser can also update (e.g., index) a bun counter for the hopper 120 after each dispense event, can trigger an auditory and/or visual alarm or transmit a notification to a nearby operator to replace the hopper 120 with a second, full hopper 120 when the counter expires (i.e., reaches "o"), and reset a second bun counter for the second hopper once the second hopper is installed and operational within the bun dispenser.

In one variation, the bun dispenser also includes a camera (e.g., a three-dimensional camera, an a RGB camera) or other optical sensor arranged over or adjacent the hopper 120 and/or the receiver 110, and the bun dispenser can sample images from the camera (e.g., at a sampling rate of 10 Hz) as gas is flowed into the hopper 120 during a dispense cycle. In this implementation, the bun dispenser can implement machine vision techniques to identify buns in digital images captured from the camera and to detect dispense dispensation of an identified bun into the receiver 110 or dispensation of an identified bun from the receiver 110 into the slicing mechanism. The bun dispenser can also implement machine vision techniques to identify buns in the hopper 120 from images captured by the camera and can update a bun counter for the hopper 120 accordingly after each dispense cycle, as described above.

As shown in FIG. 1, the bun dispenser can include a processor 150 configured to control various subsystems therein according to the foregoing methods.

1.8 Variations

One variation of the bun dispenser further includes: a second receiver adjacent and offset above the receiver 110; a second hopper configured to contain a second row of whole bread buns, defining a second discharge end configured to transiently engage the second receiver and to dispense whole bread buns into the second receiver, and defining a second pressurized end opposite the second discharge end; a second piston 130 arranged within the second hopper between the second pressurized end of the second hopper and the second row of whole bread buns; and a second permeable seal 132 interposed between an interior wall of the second hopper and an adjacent surface of the second piston 130, the second permeable seal 132 cooperating with the second hopper and the second piston 130 to define a second closed volume between the second pressurized end of the second hopper and the second piston 130, the second permeable seal 132 configured to bleed gas from the second closed volume toward the second discharge end of the second hopper. In this variation, the gas can supply selectively supply gas to the closed volume and to the second closed volume to advance the hopper 120 toward the discharge end of the hopper 120 and to advance the second hopper toward the second discharge end of the second hopper, respectively. Alternatively, the bun dispenser can include multiple gas supplies, including one gas supply 140 per receiver. In this variation, the bun dispenser can also include multiple additional receivers, hoppers, and pistons, such as four total receiver, hopper 120, and piston 130 sets aligned in a column along the slicing mechanism.

In this variation, the bun dispenser can empty each hopper 120 in the set of cycles in sequence, such as by dispensing buns from a first hopper 120 until the first hopper 120 is empty, then dispensing buns from a second hopper until the second hopper is empty, then dispensing buns from a third hopper until the third hopper is empty, etc. In particular, the bun dispenser can sequence dispensation of buns from each hopper 120 in the set of hoppers such that one or more expired hoppers (e.g., three of four hoppers loaded in the automated foodstuff assembly system) can be replaced with full hoppers while at least one hopper 120 (e.g., a fourth hopper) remains loaded with buns, thereby enabling the automated foodstuff assembly system to remain in continuous operation while additional buns are loaded into the bun dispenser.

In one implementation, the bun dispenser includes multiple hoppers that are loaded with a different type of bun and then installed in corresponding receivers with the bun dispenser. For example, at a given time, a first hopper 120 installed in a first receiver in the bun dispenser can be loaded with white buns, a second hopper installed in a second receiver in the bun dispenser can be loaded with whole wheat buns, and a third hopper installed in a third receiver in the bun dispenser can be loaded with poppy seed buns. The bun dispenser can then selectively release gas from one or more gas supplies into one of the first, second, or third hoppers to dispense a particular type of bun into the slicing mechanism, such as based on a custom food order received from a patron, assigned to a next hamburger to be assembled, and specifying the particular type of bun thus dispensed. The bun dispenser can therefore accept multiple hoppers loaded with different types, sizes, etc. of whole buns and can selectively dispense whole buns according to custom food orders submitted by patrons of the automated foodstuff assembly apparatus.

In this variation, multiple hoppers can be linked and/or connected in sets. For example, a set of four hoppers can be connected in a stack such that the whole stack of four hoppers can be removed from the automated foodstuff assembly system in unison once emptied, and a new stack of four hoppers similarly connected and filled with buns can be simultaneously installed in the automated foodstuff assembly apparatus.

2. Slicing Mechanism

As shown in FIG. 4, a second system 200 for slicing whole bread buns includes: a chute 210 defining a load end, defining a slice end vertically below the load end, and configured to receive whole bread buns from the receiver 110 between the load end and the slice end; a blade 220 extending across the chute 210 proximal the slice end of the chute 210; and a cutting block 250 arranged in the chute 210 and configured to advance from a load position to a pierce position to a slice position during a dispense cycle, the cutting block 250 adjacent the load end of the chute 210 in the load position to receive a whole bread bun from the receiver 110, arranged between the receiver no and the blade 220 in the pierce position offset from the blade 220 by less than a length of the whole bread bun for a pierce duration to pierce the whole bread bun with the blade 220, and extending past the blade 220 in the slice position to sever a crown of the whole bread bun from a heel of the whole bread bun.

In one variation, the second system 200 includes: a chute 210 defining an elongated section and an outlet, the elongated section receiving a bun dispensed from a bun dispenser; a blade 220 arranged across the chute 210 proximal the outlet and sealed about a wall of the chute 210; a reciprocating linkage 230 coupled to the blade 220 and housed within an isolated chamber 232 adjacent the chute 210; an actuator 240 arranged outside of the isolated chamber 232 and coupled to the blade 220 via the reciprocating linkage 230; and a cutting block 250 arranged within the chute 210 and operable between a first position, a second position, and a third position. In this variation, the cutting block 250: is retracted longitudinally in the chute 210 and at a first offset height above the chute 210 in the first position (shown in FIG. 5A) to restrain a bun within the chute 210; is elevated vertically to a second offset height—greater than the first height—over the chute 210 in the second position (shown in FIG. 5B) to release the bun toward the blade 220; and drives a bun into the blade 220 between the second position and the third position (shown in FIG. 5C).

2.1 Applications

Generally, the second system 200 (hereinafter "slicing mechanism") can be arranged within an automated foodstuff assembly apparatus to slice whole buns received from one or more hoppers in a bun dispenser mechanism described above. The slicing mechanism also advances the cutting block 250 between a load position in which a whole bun is dispensed from the bun dispenser into the chute 210, a pierce position in which the cutting block 250 slight compresses the whole bun against the blade 220 as the blade 220 is actuated (e.g., reciprocated) in order to pierce the skin of the whole bun, and a slice position in which the cutting block 250 has driven the whole bun fully through the blade 220 to separate the crown of the bun from the heel of the bun. In particular, the slicing mechanism can advance the cutting block 250 into the pierce position and hold the cutting block 250 in the pierce position for an extended duration of time (e.g., eight seconds) typically sufficient for the blade 220 to pierce the skin of the whole bun. With the skin of the bun thus pierced by the blade 220, the whole bun can be slicing relatively easily, and the cutting block 250 can drive the bun through the blade 220 relatively rapidly without substantially compressing or otherwise deforming the bun. Once a bun is sliced, the slicing mechanism can dispense the sliced bun into a butter stage 310 and/or into a toast stage 320 before condiments, toppings, and/or a meat (e.g., a hamburger patty), etc. are deposited onto the sliced, buttered, and toasted bun.

2.2 Chute

The chute 210 defines an elongated section and an outlet, the elongated section receiving a bun dispensed from a bun dispenser. Generally, the chute 210 functions to receive a series of buns from one or more hoppers of the bun dispenser arranged over the chute 210 and to funnel the buns serially toward the cutting block 250 and on to the reciprocating blade.

In the implementation described above in which the bun dispenser includes a set of hoppers that intermittently and serially dispense buns into corresponding receives, the receivers can be arranged over and along the length of the chute 210 and can dispense buns directly into the chute 210. For example, a set of receivers can be arranged along one side of the chute 210 such that hoppers installed in the receivers extend from one side of the chute 210 and substantially perpendicular to the chute 210. Alternatively, receivers can be arranged along the chute 210 such that hoppers installed into corresponding receivers extend outwardly from both sides of the chute 210.

The chute 210 can therefore be of a length suitable to accommodate multiple receivers that dispense buns (e.g., via gravity) from various hoppers into the chute 210. The chute 210 can also be of a width and height sufficient to accommodate buns of a particular geometry or range or geometries. The chute 210 can also be angled downward toward the reciprocating blade such that whole buns dispensed into the chute 210 are guided toward the blade 220 by gravity. The slicing mechanism can additionally or alternatively include an air knife 260 arranged at one end of the chute 210 opposite the blade 220 and configured to direct blasts of air (or nitrogen, argon, humidified air, etc.) toward the blade 220, thereby impelling buns held in the chute 210 toward the blade 220, as shown in FIG. 5B. Yet alternatively, a bottom surface of the chute 210 configured to support a dispensed buns can be perforated, and a second pump or a second valve connected to a gas reservoir within the automated foodstuff assembly apparatus can release air through the perforations to form a cushion of air under the buns, thereby reduce friction and/or stiction between buns and the chute 210 and enabling the buns to fall toward the blade 220 once dispensed from a corresponding hopper 120.

The chute 210 can further include a vane 214 immediately behind the blade 220 to maintain separation of the bun heel from the crown of the bun once the bun is sliced, as shown in FIG. 5C. The vane 214 can extend from behind the blade 220 toward a butter stage 310 and/or a toast stage 320 arrange below the chute 210. In particular, the vane 214 can partition the cross-section of the chute 210 vertically into two sections, including a lower section configured to pass bun heels to one side of the butter stage 310 and an upper section configured to pass bun crowns to the opposite side of the butter stage 310. The chute 210 and the vane 214 can further include a transition from an angled (or substantially horizontal) section to a substantially vertical section over the butter stage 310, as shown in FIG. 5A. In particular, once a bun is sliced into a bun heel and a bun crown, the chute 210 and the vane 214 can dispense the bun heel an the bun crown into corresponding sides of the butter stage 310 below.

The chute 210 and the vane 214 can be of a food-safe material, such as stainless steel, nylon, or polycarbonate. However, the chute 210 can be of any other form, dimension, and/or material.

2.3 Blade

The blade 220 is arranged across the chute 210 proximal the outlet of the chute 210 and is sealed against adjacent walls of the chute 210. Generally, the blade 220 functions to slice buns as buns are fed into the blade 220. In one implementation, the blade 220 is coupled to a reciprocating linkage 230 that translates rotary motion of the actuator 240 into linear oscillating (i.e., reciprocating) motion at the blade 220. Alternatively, the blade 220 can include a continuous bladed band supported on two wheels—at least once of which is driven in continuous rotary motion by the actuator 240—with one linear span of the blade 220 between the two wheels extending across the chute 210.

The blade 220 can include a serrated blade, a flat blade, a pair of serrated or flat blades, or any other suitable type of blade and can be of any suitable material, such as stainless steel, ceramic, or any other food-safe material that can hold a sharpened edge.

The blade 220 is arranged across the chute 210 at a height above the base surface of the chute 210 corresponding to a target thickness of bun heels to be dispensed from the slicing mechanism into the butter stage 310. The blade 220 passes through a wall of the chute 210 on one or both sides of the base surface and is sealed against the wall(s) of the chute 210. For example, the chute 210 can define a pair of rectangular bores in its vertical walls near an outlet of the chute 210, the chute 210 can include seals arranged in the rectangular bores, and the blade 220 can pass through the seals to prevent crumbs and other debris from sliced buns from exiting the chute 210 area and entering a reciprocating linkage 230 or other mechanism outside of the chute 210. For example, the chute 210 can include closed-cell silicone foam seals that seals a sharpened portion of the blade 220 within the chute 210 to prevent egress of food debris out of the chute 210 as buns are sliced by the slicing mechanism.

The actuator 240 is coupled to the blade 220 via the reciprocating linkage 230 and cooperated with the reciprocating linkage 230 to reciprocate the blade 220 across the chute 210 in a direction substantially perpendicular to the motion of buns into the blade 220. In one variation, the actuator 240 includes a rotary motor, such as an electric motor or a compressed-air-powered motor, that outputs torque through an output shaft. In this variation, the reciprocating linkage 230 is arranged between the motor output shaft and the blade 220 and transforms rotary motion from the motor into reciprocating linear motion of a suitable maximum displacement (e.g., 3 mm) and at a suitable rate (e.g., 4000 cycles per minute). In this variation, all or a portion of the reciprocating linkage 230 can be contained within the isolated chamber 232 that functions as a secondary containment area for food waste that may shifted past the seal(s) around the blade 220 during operation. The isolated chamber 232 can thus contain any such food waste and substantially prevent this debris from moving back through the seals and into the chute 210. The actuator 240 can be arrange outside of the isolated chamber 232, and a portion of the reciprocating linkage 230 can pass from the motor through a wall of the isolated chamber 232, such as through a sealed linear bearing, to the blade 220.

However, the actuator 240 and the reciprocating linkage 230 can be coupled to the blade 220 in any other suitable way to reciprocate the blade 220 back laterally.

Alternatively, the blade 220 can include a circular blade—such as a circular blade with a smooth or serrated edge—arranged across the chute 210 near an outlet of the chute 210, and the actuator 240 can rotate the blade 220 to slice buns during operation. However, the blade 220 can be of any other form or geometry, and the actuator 240 can actuate the blade 220 in any other suitable way.

2.4 Cutting Block

In one variation, the cutting block 250 is arranged within the chute 210 and is operable between a first position, a second position, and a third position. In this variation, the cutting block 250: is retracted longitudinally in the chute 210 and at a first offset height above the chute 210 in the first position (shown in FIG. 5A) to restrain a bun within the chute 210 above the blade 220; is elevated vertically to a second offset above the first offset height over the chute 210 in the second position (shown in FIG. 5B) to release the bun toward the blade 220; and drives the bun into the blade 220 between the second position and the third position (shown in FIG. 5C) to sever the blade 220 into heel and crown halves. Generally, in the first position, the cutting block 250 functions as a stop for buns dispensed from one or more hoppers arranged along the chute 210, and, in the second position, the cutting block 250 functions to release a bun from a "stopped" position into an initial slicing position between the cutting block 250 and the blade 220. Furthermore, as the cutting block 250 transitions from the second position into the third position, the cutting block 250 guides and secures the bun through the blade 220.

The cutting block 250 is arranged within the chute 210 between the blade 220 and a nearest receiver of the bun dispensing mechanism and runs along a curvilinear path parallel to a length of the chute 210. For example, the cutting block 250 and run along a "J" path, wherein the apex of the "J" defined the first position, the end of the short section of the "J" defines the second position, and the end of the long section of the "J" defines the third position, the long section of the "J" running along and substantially parallel to the chute 210 toward the blade 220, and the short section of the J" extending upward from the chute 210 (e.g., toward one or more hoppers above). In this example, with the cutting block 250 in the first position, a bun dispensed into the chute 210 runs into and is impeded by the cutting block 250 rather than running straight into the blade 220. Thus, all buns dispensed into the chute 210, regardless of when along the chute 210 and by what receiver arranged there over, are stopped by the cutting block 250 and enter the blade 220 at substantially identical speeds once released by the cutting block 250 retracted to the second position. Furthermore, in this example, as the cutting block 250 is raised above the chute 210 in the second position, a bun is released toward blade, and the cutting block 250 then engages the bun and forces the bun into the blade 220 as the cutting block 250 transitions toward the third position (at the top of the "J").

The cutting block 250 defines a trailing face and a leading face, the trailing face facing receivers of the bun dispenser arranged along the chute 210, and the leading face facing the blade 220 and opposite the trailing face. The trailing face can be flat, can be substantially perpendicular to the base surface of the chute 210, and can be substantially rigid, such as of stainless steel or nylon. Alternatively, the trailing face can be concave or angled into the base surface of the chute 210 to inhibit vertical motion of a bun away from base surface upon impact within the cutting block 250. The trailing face of the cutting block 250 can also include a material that absorbs impact by buns on the cutting block 250. For example, a bumper of silicone foam can be arranged across the trailing face of the cutting block 250. The leading face of the cutting block 250 defines a V-shaped mouth that constrains a bun between non-parallel surfaces as the cutting block 250 advances forward to feed the bun into the blade 220. The (substantially) vertical surfaces of the V-shaped mouth of the cutting block 250 can be smooth, rough, serrated, or of any other suitable profile or surface finish suitable to substantially prevent rotation of a bun as the bun passes fully through the blade 220. The mouth of the cutting block 250 can also define a concave recess extending toward the trailing face of the cutting block 250, the blade 220 passing into the concave recess within contacting the cutting block 250 as the cutting block 250 is driven into the third position.

The cutting block 250 can be suspended in the chute 210 from one or more beams passing through one or more walls of the chute 210 and coupled to an actuator that drives the cutting block 250 between the first, second, and third positions. In one implementation, a vertical wall of the chute 210 defines (or is physically coextensive with a plate that defines) a pair of offset J-tracks 214, and one beam extends through each of the J-tracks 214 to support the cutting block 250. One or both beams are coupled to a chain suspended between a driven sprocket and an idler sprocket, and the actuator powers the driven sprocket to shift the position of the chain, thereby moving the cutting block 250 along the track. For example, the actuator can rotate the driven sprocket in a first direction to move the cutting block 250 from the third position to the first position and then into the second position, and then rotate the actuator in the opposite direction to move the cutting block 250 from the second position (through the first position) into the third position.

Figure 6:
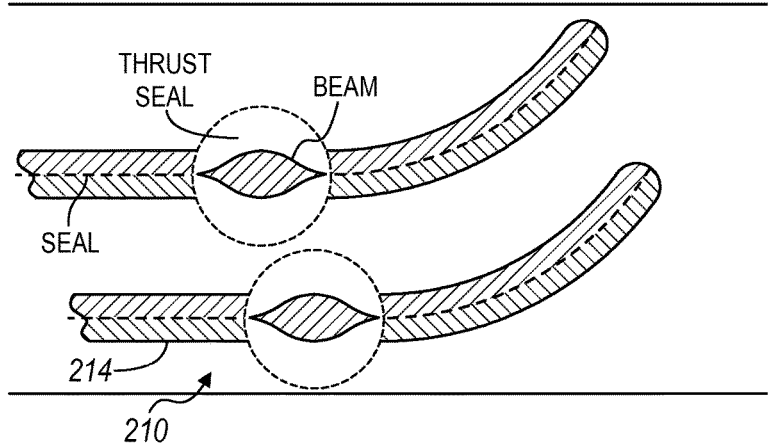
FIG. 6 is a schematic representation of one variation of the second system.

In the foregoing implementation, the beams supporting the cutting block 250 can be sealed about the J-tracks 214. For example, a silicone foam panel 334 can be arranged across the vertical wall of the chute 210 opposite the cutting block 250, and the silicone foam panel 334 can define slits aligned with the J-tracks 214. The beams supported the cutting block 250 through the vertical wall of the chute 210 can pass through corresponding slits in the silicone foam panel 334, which can seal the beams to the vertical wall of the chute 210, as shown in FIG. 6. In particular, the silicone foam panel 334 can prevent egress of buns crumbs (and other such food waste) from the chute 210 and similarly prevent ingress of food waste or other particulate (such a gear or motor grease) into the chute 210. In this example, each beam can define a teardrop or similar profile (shown in FIG. 6) over at least a portion of the beam the passed through the silicone foam seal to improve sealing capacity of the silicone foam panel 334 into the beams. Static or spring-loaded thrust seals can additionally or alternatively be arranged about the beams and engage the vertical wall of the chute 210 adjacent the cutting block 250 and/or the silicone foam panel 334 opposite the chute 210 to further seal the beams to the chute 210, as shown in FIG. 6. However, the cutting block 250 can be supported in any other way within the chute 210, can be driven between the first, second, and third positions within the chute 210 in any other way, and can be sealed within the chute 210 with any other suitable type or configuration of seal.

In another variation, the cutting block 250 is advanced and retracted linearly along the chute 210 between a load position, a pierce position, and a slice position. In this variation, in the load position the cutting block 250 can be retracted above the first (e.g., highest) receiver in the bun dispenser to enable each receiver in the bun dispenser to dispense whole buns into the chute 210 between the cutting block 250 and the blade 220. In this variation, the cutting block 250 can be sealed against wall of the chute 210 and can define a V-block geometry as described above. The cutting block 250 can also be connected to and repositioned within the chute 210 by a linear actuator, such as connected to a timing belt and rotary actuator, as described above. However, the cutting block 250 can be sealed against the chute 210 in any other way, can be of any other geometry, and can be actuated by any other suitable type of mechanism or actuator.

2.5 Slicing Operation

Figure 7:
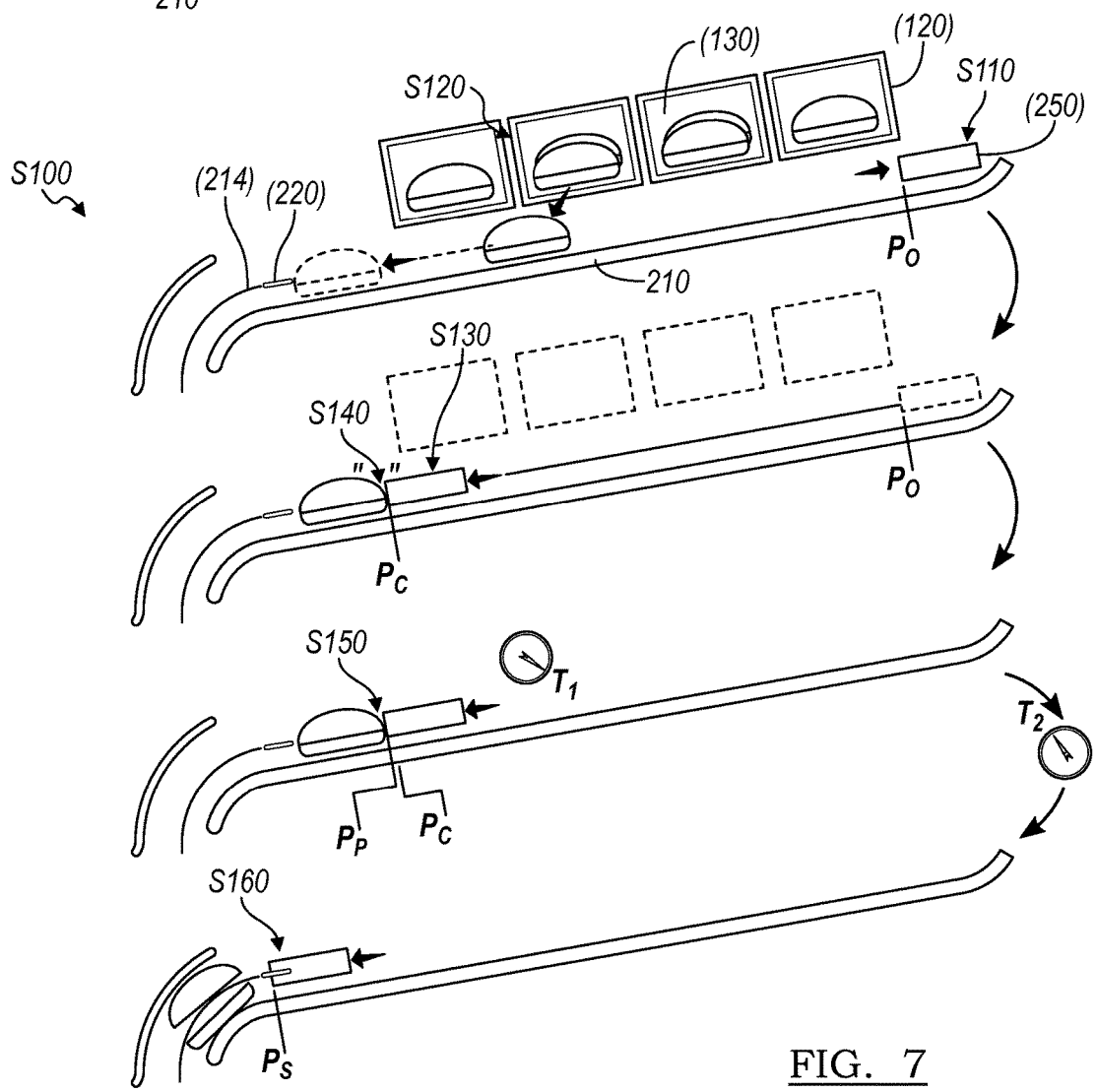
FIG. 7 is a flowchart representation of one method for dispensing and slicing whole bread buns.

As shown in FIG. 7, the slicing mechanism can execute a method S100 for dispensing and slicing whole bread buns including: retracting a cutting block 250 along a chute 210 into a load position in Block Silo; dispensing a whole bread bun into the chute 210 between the cutting block 250 and a blade 220 extending across the chute 210 in Block S120; advancing the cutting block 250 along the chute 210 toward the blade 220 in Block S130; detecting contact between the cutting block 250 and the blade 220 at a contact position in Block S140; at a first time, advancing the cutting block 250 into a pierce position offset from the contact position toward the blade 220 by a pierce distance less than a common width of the type of whole bread buns in Block S150; and, at a second time succeeding the first time by a pierce duration, advancing the cutting block 250 from the pierce position into a slice position adjacent the blade 220 to drive the whole bread bun fully through the blade 220 in Block S160.

Generally, the slicing mechanism can execute the method to retract the cutting block 250 into the load position, to dispense a whole bread bun into the chute 210, to advance the cutting block 250 into the whole bread bun to slightly compress the whole bread bun against the blade 220 for a pierce duration (e.g., for several seconds), and to advance the cutting block 250 into the slice position to drive the whole bread bun fully through the blade 220 once the blade 220 pierces the skin of bun during the pierce duration.

Because whole buns may vary in diameter, the slicing mechanism can advance the cutting block 250 to a pierce position substantially unique to each whole bun. The slicing mechanism can therefore advance the cutting block 250 toward the blade 220 until the cutting block 250 contacts a bun and then further advance the cutting block 250 toward the blade 220 by the pierce distance to compress the bun toward the knife. For example, as an actuator drives the cutting block 250 from the load position toward the blade 220, the slicing mechanism can monitor a current draw of the actuator, correlate a detected change in this current draw with contact between the cutting block 250 and the whole bread bun, and storing a position of the cutting block 250 (and/or the actuator) at a time of the detected change in electrical current as a contact position for the bun. Alternatively, the cutting block 250 can include an optical, acoustic, mechanical, or other type of switch or sensor arranged on or adjacent a face of the cutting block 250 configured to contact a bun, and the slicing mechanism can sample the switch while the cutting block 250 is driven from the load position toward the blade 220 and can identify contact between the cutting block 250 and a bun based on a change in the output of the switch. For example, the cutting block 250 can define a V-shaped mouth and can include a mechanical momentary switch arranged on each concave side of the V-shaped mouth. In this example, because a bun may contact one mechanical momentary switch on one side of the V-shaped mouth and then translate laterally before contacting the second mechanical momentary switch on the opposite side of the V-shaped mouth, the slicing mechanism can determine that the cutting block 250 has made full contact with the bun when both mechanical momentary switches are closed. Thus, in this example, the slicing mechanism can store a position of the cutting block 250 (and/or the actuator) at a time at which both mechanical momentary switches are closed as a contact position for the bun. However, the slicing mechanism can detect contact between the cutting block 250 and a bun in any other way.

Subsequently, the slicing mechanism can advance the cutting block 250 from the contact position toward the blade 220 by a preset pierce distance substantially less than a common width of whole bread buns in the row of whole bread buns. For example, the slicing mechanism can advance the cutting block 250 by a pierce distance between 0.5 millimeter and 2.0 millimeters from the contact position—along the long axis of the chute 210—for a type of bread bun ranging from 2.5 inches in diameter to 5 inches in diameter. For example, the slicing mechanism can advance the cutting block 250 from the contact position into the pierce position by a pierce distance slightly greater than the skin thickness typical of the type of bun dispensed into the slicing mechanism. The slicing mechanism can then constrain the cutting block 250 in the pierce position for a pierce duration, such as for a period of time between five seconds and ten seconds, before advancing the cutting block 250 from the pierce position into the slice position. Thus, during the pierce duration, the slicing mechanism ca compress the bun—between the cutting block 250 and blade—to a diameter 0.5 to 2.0 millimeters less than the nominal diameter of the bun. While the cutting block 250 is in the pierce position during the pierce duration, the slicing mechanism also actuates (e.g., reciprocates) the blade 220, which may pierce the skin of the bun by (approximately) the pierce distance as the bun expands toward the blade 220 at it attempts to return to its nominal diameter. Upon expiration of the pierce duration, the slicing mechanism can advance the cutting block 250 from the pierce position to the slice position to drive the bun fully through the blade 220. For example, the slicing mechanism can advance the cutting block 250 from the pierce position to the slice position as a rate of 0.2 meters per second. Therefore, the slicing mechanism can slightly compress a bun into the blade 220, wait for the blade 220 to pierce the bun, and then drive the bun through the blade 220 rather than forcing the bun through the blade 220 in one motion, which may plastically deform the bun.

In the foregoing implementation, the slicing mechanism can also implement a dynamic pierce time. For example, the slicing mechanism can determine that the blade 220 has pierced a bun in response to a change in current draw of the actuator driving the blade 220. In another example, the slicing mechanism includes a camera or other optical sensor directed toward the leading edge of the blade 220, and the slicing mechanism implements machine vision techniques to determine that the blade 220 has pierced the bun from digital images output by the camera.

In another implementation, the slicing mechanism can measure a diameter of each bun dispensed into the chute 210 and can advance the cutting block 250 to a pierce position offset from the blade 220 by the measured diameter of a bun in the chute 210 less the pierce distance. For example, the slicing mechanism can include a distance sensor—as described above—coupled to the chute 210, aligned with the axis of the chute 210, and facing the blade 220, wherein the distance sensor defines a field of view and outputs a signal corresponding to a distance from the distance sensor to a (nearest) surface within the field of view. In this example, the cutting block 250 can include a window aligned with the field of view of the distance sensor, and the distance sensor can thus sense a surface of a bun between the blade 220 and the cutting block 250 through the window in the cutting block 250. The slicing mechanism can thus measure the diameter of a bun dispensed into the chute 210 by subtracting a distance value output by the distance sensor from a known distance between the distance sensor and the blade 220 once a dispense event is detected during a dispense cycle. In this example, for a type of bun exhibiting significant variations in diameter (or width and/or length), a point on a bun located in the chute 210 nearest the distance sensor may not coincide with the field of view of the distance sensor because the bun may not land and remain aligned with the center of the chute 210. The slicing mechanism can these also include a second distance sensor facing the blade 220 along a second axis nonparallel to the long axis of the chute 210. The slicing mechanism can thus merge distance values output by the (first) distance sensor and the second distance sensor to calculate the diameter of a bun dispensed into the chute 210.

Alternatively, in the foregoing implementation, the slicing mechanism can include a mechanical wiper adjacent the blade 220 and configured to displace the bun laterally across the chute 210 until the bun abuts a reference surface; the slicing mechanism can sample a position sensor coupled to the wiper (e.g., an optical encoder, a potentiometer) to determine this final (angular or linear) position of the wiper and can then correlate this position with a width of the bun. The slicing mechanism can then implement the method described above to advance the cutting block 250 into the pierce position and, as some time later, drive the cutting block 250 to the slice position to separate the heel of the bun from the crown of the bun.

2.6 Error Handling

In one variation, the slicing mechanism: detects dispensation of a second whole bread bun followed by dispensation of a third whole bread bun into the chute 210; opening a discard chute 210 adjacent the blade 220 opposite the cutting block 250; at a fourth time succeeding the third time, advancing the cutting block 250 along the chute 210 into a second pierce position to compress the second whole bread bun between the third whole bread bun and the blade 220; and at a fifth time succeeding the fourth time by the pierce duration, advancing the cutting block 250 into the slice position to drive the second whole bread bun fully through the blade 220 and into the discard chute 210.

Generally, the slicing mechanism can execute such an error handling method to discard one or both buns dispensed into the chute 210 when two buns are released into the chute 210 in a single dispense cycle. In one example, the slicing mechanism samples optical sensors, capacitive sensors, and/or proximity sensor arranged along the chute 210 to determine a total length of a line contact along the chute 210 and determines that two buns have been dispensed into the chute 210 if the total length of the line contact exceeds a threshold maximum diameter of single bun of a type loaded into the bun dispenser. In another example, the slicing mechanism samples optical break sensor arranged along the chute 210 and counts a number of optical breaks at a single optical break sensor during a single dispense cycle; if the number of optical breaks at the single optical break sensor exceeds one (or if the number of state changes of the optical break sensor exceeds two) in a single dispense cycle, the slicing mechanism can determine that two buns have been dispensed into the chute 210. The slicing mechanism can then execute this error handling method to discard one or more buns in the chute 210. However, the slicing mechanism can detect a double-dispense event in any other suitable way.

In one implementation, the slicing mechanism includes a first trap configured to transiently engage the chute 210 behind the vane 214 and to guide a bun crown from the vane 214 into a discard container; in this implementation, the slicing mechanism includes a second trap configured to transiently engage the chute 210 behind the vane 214 and to guide a bun heel from the vane 214 into the discard container. Thus, when a double-dispense event is detected, the slicing mechanism can advance the first and second traps forward into discard positions adjacent the vane 214, and the slicing mechanism can then driven the cutting block 250 from the load to the slice position in a single motion to slice and discard both buns. Alternatively, the slicing mechanism can implement methods and techniques described above to advance the cutting block 250 to a pierce position for a first bun immediately adjacent the blade 220, thereby compressing the first bun between the blade 220 and a second bun interposed between the first bun and the cutting block 250, and then drive the cutting block 250 to the slice position in a single subsequent motion to slice and discard both buns.

Thus, by first piercing the first bun by slowly compressing the first bun against the blade 220, the blade 220 can constrain the first bun to prevent the first bun from otherwise skipping across the blade 220 and lifting out of the chute 210 when the cutting block 250 is driven fully to the slice position. In this implementation (and the foregoing implementations), the cutting block 250 can also include a substantially rigid or spring-loaded tab extending toward the blade 220 and offset above the bottom surface of the chute 210 by at least a typical height of a type of bun loaded into the hopper 120 (e.g., offset above the bottom surface of the chute 210 by a distance substantially equivalent to a maximum allowable height of the type of bun loaded into the hopper 120). For example, the tab extending from the cutting block 250 can be substantially similar to the tab extending from the piston 130, as described above. The tab extending from the cutting block 250 can thus prevent the second bun—behind the first bun—from pitching sufficiently to lift out of the chute 210 as the cutting block 250 is advanced into the slice position during a discard cycle.

Furthermore, in this implementation, because the second bun may have pitched slightly within the chute 210 as the first bun is sliced, the second bun may not be lying flush with the bottom surface of the chute 210 when caught by the blade 220. Therefore, because the second bun may meet the blade 220 off-angle, thereby yielding a wedge-shaped bun heel, the slicing mechanism can also discard the second bun following a double-discard event.

However, the slicing mechanism can implement any other method or technique to discard one or both buns following a double-discard event.

3. Buttering and Toasting System

Figure 8:
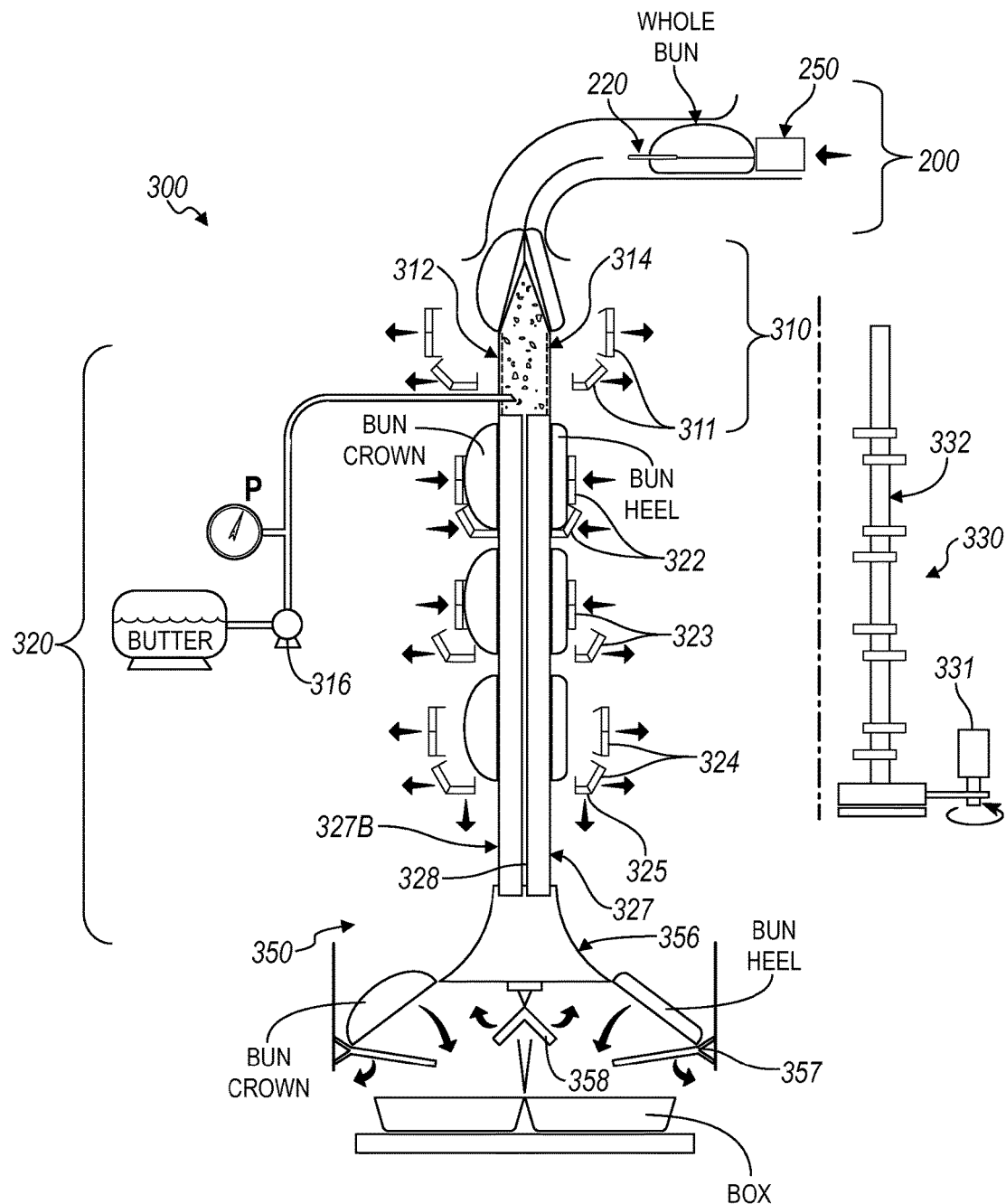
FIG. 8 is a schematic representation of a third system.

As shown in FIG. 8, a third system 300 for buttering and toasting bread buns includes a butter stage 310 and a toast stage 320. The butter stage 310 includes: a vessel 312 containing liquefied dairy fat and defining a permeable surface 314; a pressure supply 316 fluidly coupled to the vessel 312; a first paddle assembly 311 configured to catch a bun crown dispensed into the butter stage 310, to compress a sliced face of the bun crown directly against the permeable surface 314, and to release the bun crown from the butter stage 310. The toast stage 320 includes: a toasting surface 327 arranged vertically below the permeable surface 314; a heating element 328 arranged behind the toasting surface 327; a second paddle assembly 322 arranged vertically below the first paddle assembly 311 and configured to catch the bun crown released from the first paddle assembly 311, to compress the sliced face of the bun crown directly against the toasting surface 327, and to release the bun crown from the toasting surface 327; and a third paddle assembly 323 arranged vertically below the second paddle assembly 322 and configured to catch the bun crown released from the second paddle assembly 322, to compress the sliced face of the bun crown directly against the toasting surface 327, and to release the bun crown from the toasting surface 327.

One variation of the third system 300 includes: a dispenser configured to dispense a bun crown and a bun heel sliced from a whole bread bun; a heating device arranged below the dispenser and including a first toasting surface 327, a second toasting surface 327B opposite and parallel to the first toasting surface 327, and a heating element 328 interposed between the first toasting surface 327 and the second toasting surface 327B; a first set of compression paddles arranged in a first row adjacent the first toasting surface 327, each compression paddle in the first set of compression paddles operable between a compress position and a release position, configured to sequentially compress the bun crown directly onto the first toasting surface 327 in the compress position, and configured to release the bun crown in the release position; a first set of gate paddles, each gate paddle in the first set of gate paddles arranged below a corresponding compression paddle in the first set of compression paddles, operable between a retain position and a dispense position, configured to sequentially support the bun crown vertically in the retain position, and configured to release the bun crown downward in the dispense position; a second set of compression paddles arranged in a second row adjacent the second toasting surface 327B, each compression paddle in the second set of compression paddles operable between a compress position and a release position, configured to sequentially compress the bun heel directly onto the second toasting surface 327B in the compress position, and configured to sequentially release the bun heel in the release position; a second set of gate paddles, each gate paddle in the second set of gate paddles arranged below a corresponding compression paddle in the second set of compression paddles, operable between a retain position and a dispense position, configured to sequentially support the bun heel in approximate vertical and horizontal alignment with the bun crown in the retain position, and configured to sequentially release the bun heel downward in the dispense position; and an actuator system 330 configured to selectively transition compression paddles in the first set of compression paddles and in the second set of compression between compress positions and release positions and configured to selectively transition gate paddles in the first set of gate paddles and in the second set of gate paddles between retain positions and dispense positions according to a paddle sequence to sequentially advance the bun crown and the bun heel, in a row of bun crown and bun heel pairs, down the first toasting surface 327 and down the second toasting surface 327B.

3.1 Applications

Generally, the third system 300 for buttering and toasting bread buns (herein after the "buttering and toasting system") functions to receive a series of bun heel and bun crown pairs, such as from the bun slicing mechanism, to butter the inner faces of the bun heel and bun crown pairs, and to toast the inner faces of the bun heel and bun crown pairs before dispensing the bun heels and bun crowns into or onto containers—such as boxes, plates, or sandwich assembly platens—supported a conveyance platform below. The buttering and toasting system can thus form a subsystem of an automated foodstuff assembly system including one or more other subsystems that cooperate to automatically prepare, assemble, and deliver foodstuffs for and/or to consumers. For example, the automated foodstuff assembly system can include a patty grinding subsystem that grinds and presses custom hamburger patties from raw meat (e.g., based on custom patty orders), a patty grilling subsystem that grills patties (e.g., rare, medium, or well-done based on custom patty orders), a bun dispenser subsystem that stores whole buns, a slicing mechanism subsystem that slices buns received from the bun dispenser subsystem, a bun buttering subsystem that applies butter to each side of sliced buns prior to toasting each halve of the bun, a bun toasting subsystem that toasts bun halves, a topping module that loads toppings onto bun heels (e.g., based on custom topping orders), and a boxing subsystem 350 that closes completed hamburgers into paper boxes for delivery to patrons. The buttering and toasting system can similarly butter can toast bread products for assembly into sandwiches, hotdogs, burritos, tacos, wraps, or other foodstuffs, such as according to custom food orders entered by patrons of an automated restaurant. The buttering and toasting system can therefore be incorporated into an automated foodstuff assembly system to butter and toast one or more halves of freshly-cut buns before dispensing the buttered and toasted buns into or onto a contained for subsequent assembly into a sandwich for a customer.

The buttering and toasting system can feed bun heels substantially vertically downward over a substantially translucent or transparent heated surface (i.e., the toasting surface 327) such that both sides of the bun heel are visible to patrons near the automated foodstuff assembly system, thereby enabling patrons to view bun heels changing color (e.g., from off-white to light brown) as the bun heels advance through subsequent toasting stages of the buttering and toasting system. The buttering and toasting system can similarly feed bun crowns over an adjacent translucent or transparent surface to enable patrons to view both sides of a bun crown as it is toasted.

The buttering and toasting system is described herein as a system for buttering and toasting bun heels. However, the system can also butter and toast bun crowns, such as simultaneously with matched bun heels. An automated foodstuff assembly apparatus can include the buttering and toasting system to butter and toast bun heels on one side of the butter and toast stages and to butter and toast bun crowns on an opposite side of the butter and toast stages. For example, bun heels can be fed vertically downward along one side of a butter stage 310 and bun crowns can be fed vertically downward along an opposite side of a butter stage 310, a single heating element 328 can be arranged between the a heel-side toasting surface 327 and a crown-side toasting surface 327—parallel and offset from the heel-side toasting surface 327—such that bun crowns and bun heels are heated with the same heating element 328, and a single actuator can drive both a set of gate and compression paddles adjacent the heel toasting surface 327 and a set of gate and compression paddles adjacent the crown toasting surface 327 such that bun heel and bun crown pairs are advanced in unison through the heel-side and crown-side butter and toast stages. In this example, the buttering and toasting system can advance a bun heel and bun crown in vertical alignment (and in horizontal alignment or offset horizontally) along the buttering surfaces (i.e., the permeable surfaces) and the toasting surfaces such that the bun heel and bun crown pair remain paired and matched throughout processing.

3.2 Butter Stage

The butter stage 310 includes a substantially vertical surface that dispenses butter onto a bun heel. Generally, the butter stage 310 functions to receive a bun heel from a slicing mechanism and to portion butter onto the interior face of the bun heel before the bun heel is toasted. The slicing mechanism can deliver the bun heel vertically downward into the butter stage 310, and the butter stage 310 can dispense butter through the vertical surface onto the interior surface of the bun heel. The bun heel can therefore continue to pass vertically downward along the vertical surface of the butter stage 310 and then enter the toasting surface 327 in a substantially vertical orientation.

In one implementation, the first paddle assembly 311 includes a first compression paddle and a first gate paddle adjacent the butter stage 310. As a bun heel is dispensed from the slicing mechanism, the first compression paddle can be in a release position and the first gate paddle can be in the retain position such that a portion of the bun heel passes the first compression paddle and is stopped by the first gate paddle. The actuator—coupled to the first compression and gate paddles, such as via a camshaft 332—can then transition the first compression paddle into the compress position to compress the bun heel into the vertical surface of the butter stage 310. Once sufficient butter is applied to the bun heel, then the first gate paddle can open into a dispense position and the first compression paddle can then open into the release position to dispense the bun heel downward into the toast stage 320. For example, a second compression paddle adjacent the toasting surface 327 can be set in the release position and a second gate paddle—adjacent the toasting surface 327, below the second compression paddle, and cooperating with the second compression paddle to define defining a second stage—can be set in the retain position to receive and retain the buttered bun heel thus received from the butter stage 310 above.

The butter stage 310 can dispense salted butter, unsalted butter, clarified butter, olive oil, margarine, canola oil, or other liquefied dairy fat or other suitable foodstuff onto buns heels dispensed into the butter stage 310. In one implementation, the butter stage 310 includes: a vessel 312 containing liquefied dairy fat (e.g., butter or any other suitable foodstuff) and defining a permeable surface 314; and a pressure supply 316 (e.g., a pump) fluidly coupled to the vessel 312. In this implementation, the vessel 312 can store liquefied dairy fat and can dispense liquefied dairy fat through perforations, pores, or other through-bores across the permeable surface 314 when the pressure supply 316 pressurized the vessel 312, such as by pumping gas (e.g., air) or additional liquefied dairy fat into the vessel 312. In particular, in this implementation, when the first compression paddle compresses the inner face (i.e., the sliced face) of a bun heel against the permeable surface 314 in the butter stage 310, the pressure supply 316 can pump liquefied dairy fat into the vessel 312, which then releases liquefied dairy fat through these perforations, thereby butting the heel. In one example, the vessel 312 can define a set of bores patterned across a permeable region—on the permeable surface 314—of diameter approximating a maximum, minimum, or average diameter of a type of the bun heel dispensed into the buttering and toasting system. In another example, the vessel 312 can include an open-celled substrate (e.g., a silicone foam, a polymer foam, a porous ceramic) defining the permeable surface 314. The pressure supply 316 can thus pressurize the vessel 312 as the first compression paddle compresses the bun heel against the permeable surface 314 of the butter stage 310, and the permeable surface 314 of vessel 312 can thus pass (e.g., excrete, leak, exude, ooze) liquefied dairy fat onto the interior surface of a bun heel.

In the foregoing implementation, the vessel 312, a supply line coupling the vessel 312 to the pressure supply 316, a remote reservoir coupled to (e.g., interposed between) the pressure supply 316 and the vessel 312, and/or the permeable surface 314 of the butter stage 310 can be heated to maintain sufficient temperature within the butter stage 310 to maintain dairy fat (or other foodstuff contained therein) in liquefied form. For example, the butter stage 310 can include one or more inductive heating elements arranged behind the permeable surface 314, within or under the vessel 312, around the remote reservoir, etc. Alternatively, the vessel 312 and its contents can be heated by a heating element 328 in the adjacent the toast stage 320.

In the foregoing implementation, the pressure supply 316 intermittently pressurizes the vessel 312 in response to compression of the bun crown against the permeable surface 314 by the first paddle assembly 311. In one variation of the buttering and toasting system, the butter stage 310 further includes a fourth paddle assembly 324—opposite the first paddle assembly 311—configured: to catch a bun crown dispensed from the slicing mechanism with a corresponding bun heel; to compress a sliced face of the bun crown directly against a second permeable surface 314 of the vessel 312 opposite the (first) permeable surface 314; and to release the bun crown from the butter stage 310 substantially simultaneously with the bun heel. In this variation, the buttering and toasting system can include a single pressure supply 316 that pressurizes the vessel 312 to force liquefied dairy fat out of both the (first) permeable surface 314 and the second permeable surface 314 to butter the bun heel and the bun crown substantially simultaneously. In this variation, like the (first) permeable surface 314, the second permeable surface 314 of the butter stage 310 can define a group of perforations across a second permeable region approximating the geometry of a type of bun dispensed into the buttering and toasting system, such as a 4-inch-diameter region for brioche buns ranging from 2.5 inches to 5 inches in diameter and averaging ~3.9" in diameter. In this variation, the second permeable region on the second permeable surface 314 can be vertically aligned with the (first) permeable region of the (first) permeable surface 314 but can be offset horizontally from the (first) permeable region, such as by half of or by a full width of an average bun; the compression and gate paddles on each side of the butter and toast stage can maintain this horizontal offset as bun heels and crowns are advanced downward such that both sides of the bun heel and both sides of the bun crown may be visible through the toast stage 320.

In another implementation, the butter stage 310 includes a vertical surface defining a set of open sections, such as perforations in a grated area or a set of adjacent vertical vanes, and the butter stage 310 includes a spray nozzle arranged behind the series of open sections and a pump that drives liquefied dairy fat from a heated reservoir, through the nozzle, and onto the bun heel compressed against the open section of the vertical surface by the first compression paddle.

In another implementation, the butter stage 310 includes a vertical surface defining one or more orifices, and the butter stage 310 includes a roller 112 that collects liquefied dairy fat from a heated reservoir (e.g., by advancing into the reservoir prior to a butter application cycle) and then rolls across the orifice(s) to dispense butter onto the interior surface of a bun heel held against the vertical surface by the first compression paddle.

However, the butter stage 310 can include any other suitable mechanism arranged in any other suitable way to dispense butter onto a surface of a bun heel.

Figure 9:
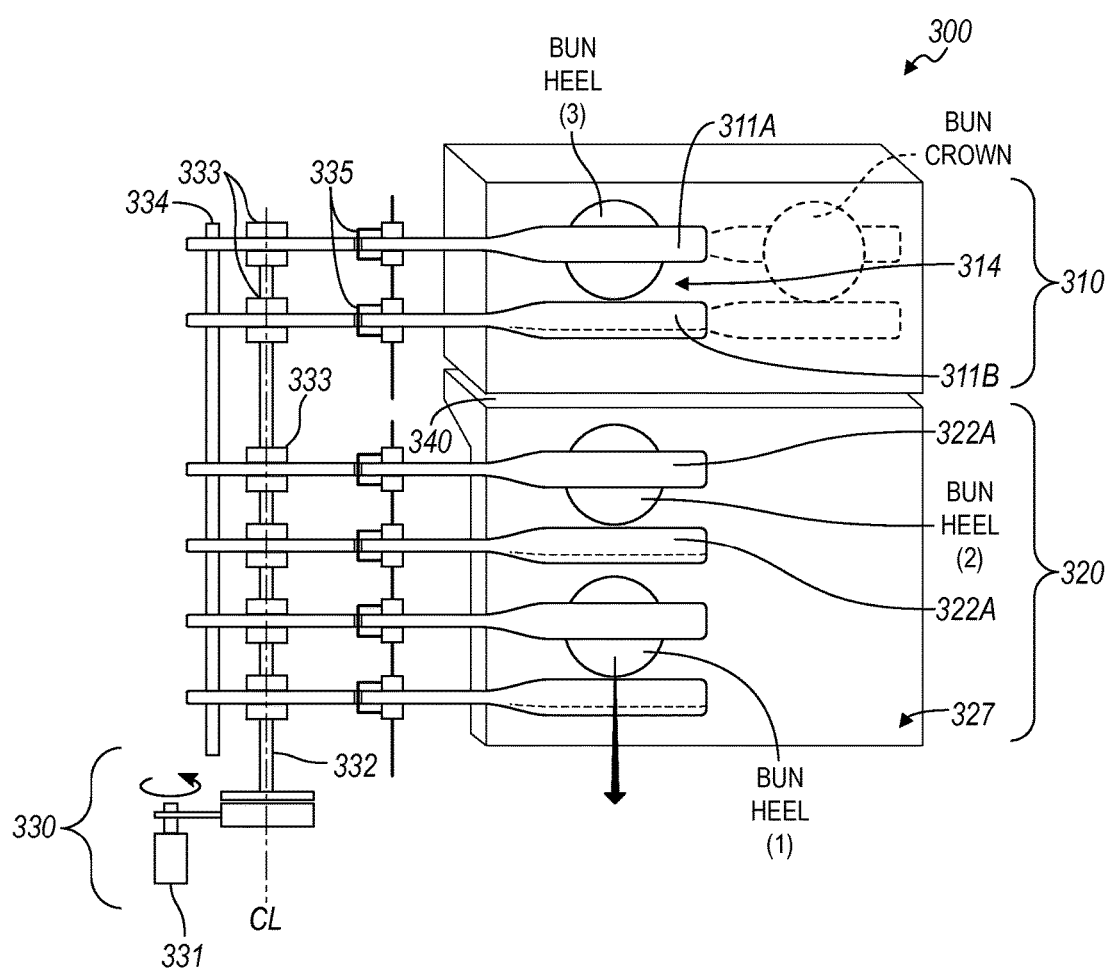
FIG. 9 is a schematic representation of one variation of the third system.

As shown in FIG. 9, the butter stage 310 can also include a drip pan 340 interposed between the permeable surface 314 and the toasting surface 327, wherein the drip pan 340 defines a recess offset behind the permeable surface 314. In this implementation, the drip pan 340 can catch excess dairy fat released from the butter stage 310 and can catch crumbs and other debris released from the bun heel and/or from the slicing mechanism. In one example, the drip pan 340 includes: a first lip extending downward from the bottom of the permeable surface 314 and angled backward behind the permeable surface 314 (e.g., at a shallow angle of 15° from the perm bale surface); and a second lip in plane with the permeable surface 314 and offset vertically below the first lip; and a heated waste reservoir arranged behind the second lip and configured to catch excess dairy fat and debris. However, the drip pan 340 can be of any other suitable geometry and can function in any other way to collect excess dairy fat and debris from the butter stage 310.

3.3 Toast Stage

The toasting stage includes a toasting surface 327 arranged vertically below the permeable surface 314 and a heating element 328 arranged behind the toasting surface 327. Generally, the toasting surface 327 functions to conduct heat into bun heels held against the toasting surface 327, such as by compression paddles, to toast the surfaces of the bun heels in contact with the toasting surface 327. The toasting surface 327 can therefore define an elongated section containing and/or adjacent one or more heating elements, and the actuator 331 can cycle the compression and gate paddles along the butter and toast stages according to a particular sequence to sequentially and intermittently release bun heels from the butter stage 310 vertically downward through sub-stages along the toasting surface 327. In one implementation, the permeable surface 314 and the toasting surface 327 are substantially planar, and the permeable surface 314 is arranged over and in alignment with the toasting surface 327, and the paddle assemblies can thus intermittently drop bun heels downward through sub-stages on the toasting surface 327.

In one implementation, the toasting surface 327 can include a first transparent glass plate (e.g., alkali-aluminosilicate glass), a second transparent glass plate, and a wire-based heating element 328 (e.g., cupronickel nanowire, carbon crystal nanowire) interposed between the first and second glass plates. The buttering and toasting system can also include a power supply that passes current through the heating element 328 to heat the first and/or second glass plate. In this implementation, the first glass plate can be relatively thin, such as 0.5 mm to 2.0 mm in thickness, and can define the toasting surface 327 configured to directly contact and to toast the interior surfaces of bun heels, and the second glass plate can be relatively thick, such as 4 mm in thickness, such that heat is predominately conducted from the heating element 328 through the first plate (rather than through the second plate). However, the toast stage 320 can include any other number of resistance heating elements, inductance heating elements, and/or other suitable type of heating element 328.

In one variation, the buttering and toasting system is further configured to butter and toast bun crowns. In this variation, the exterior surface of the first plate can define a first toasting surface 327 configured to toast bun heels, and an exterior surface of the second plate can define a second toasting surface 327B configured to toast bun crowns; a single heating element 328 (or single set of heating elements) interposed between the first and second plates can thus heat both the first and second toasting surfaces. In this variation, paddle assemblies on each side of the first and second plates can cooperate to sequence a bun heel and a bun crown pair (i.e., a bun heel and a bun crown cut from the same bun) downward in unison along the first heating surface and the second heating surface, respectively, such that the bun heel and the bun crown are toasted and dispensed from the buttering and toasting system (such as into a box or other container) together. Furthermore, in this variation, a first set of paddle assemblies adjacent the first plate can restrain bun heel along a first vertical path along the first plate, and a second set of paddle assemblies adjacent the second plate can restrain bun crowns along a second vertical path—offset laterally from the first vertical path—along the second plate such that both sides of the bun heel and the bun crown are visible through the transparent or translucent toasting surfaces.

The toasting surface 327 can alternatively be of aluminum, stainless steel, Teflon-coated steel, or any other suitable conductive material(s). A heating element 328 or heat source coupled to the toasting surface 327 can also be of any other suitable type or configuration.

3.4 Paddles

The buttering and toasting system includes stack of paddle assemblies arranged vertically along the toasting surface 327. Each paddle assembly can include a compression paddle that is operable between a compress position and a release position, wherein the compression paddle depresses a bun heel against the toasting surface 327 in the compress position and releases the bun heel in the release position. Each paddle assembly can also include a gate paddle: arranged below a compression paddle in the corresponding paddle assembly; that cooperates with the corresponding compression paddle to define a toasting stage; and that is operable between a retain position and a dispense position, wherein the gate paddles vertically supports a bun heel in the retain position and passes the bun heel downward in the dispense position.

The paddle assemblies can include compression and gate paddles that are substantially transparent (or translucent) to enable bun heels passing downward along the toasting surface 327 to be viewed by an operator and/or by patrons near the automated foodstuff assembly apparatus. For example the paddles can be of transparent or translucent heat-resistant plastic, of glass, or of a metal (e.g., aluminum) mesh of a high aspect ratio (i.e., open area to wire size). Alternatively, the paddles can be of aluminum, stainless steel, Teflon-coated mild steel, or of any other suitable material.

In one implementation, the paddle assemblies are arranged in a vertical stack adjacent the butter stage 310 and the toast stage 320 with one compression paddle arranged over a corresponding gate paddle per paddle assembly. Each compression paddle in the vertical stack can pivot about an axis substantially parallel to the toasting surface 327. In particular, a compression paddle can pivot inwardly into the compress position to compress an adjacent bun heel directly onto the toasting surface 327 (or onto the permeable surface 314 of the butter stage 310), and the compression paddle can pivot outwardly into the release position to release a bun heel from the toasting surface 327. Similarly, a gate paddle can pivot inwardly into the restrain position to vertically support a bun adjacent the toasting surface 327 (or adjacent the permeable surface 314 of the butter stage 310), and the gate paddle can pivot outwardly into the dispense position to pass a bun heel downward into a subsequent paddle assembly (or into a box or other container below). The compression and gate paddles can pivot about the same or dissimilar axes. Alternatively, the compression paddles can be supported by linkages that translate and/or rotate the compression paddles between the compress and release positions, and the gate paddles can be similarly supported by linkages that translate and/or rotate corresponding gate paddles between the restrain and dispense positions.

Figure 11:
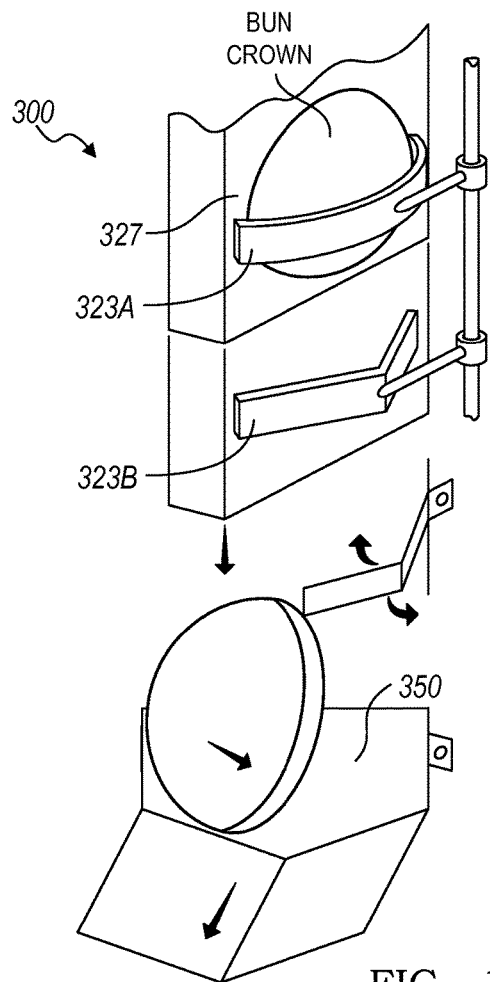
FIG. 11 is a flowchart representation of one variation of the third system.

Each compression paddle can define a concave cupped or domed cavity facing the toasting surface 327, wherein the cavity receive a bun heel (or a bun crown) and functions to substantially center the bun heel within the compression paddle, such as shown in FIG. 11. Furthermore, each gate paddle can define a spaded end facing the toasting surface 327, as shown in FIGURE ii, wherein the spaded end of the gate paddle receives a bun heel (or a bun crown) and functions to catch a bun heel dispensed from a paddle assembly or the slicing mechanism above and to guide the bun heel back toward the toasting surface 327. Each gate paddle can additionally or alternatively include a lip 325 extending toward the toasting surface 327 and configured to catch a bun heel (or a bun crown) dispensed from above.

Each compression paddle can further define a flexure or other flexible structure between a pivot (or other linkage connection) and the end of the compression paddle adjacent the toasting surface 327. In particular, a flexibility (or elasticity) of a compression paddle can be tuned to an elasticity (or "loft" and/or height) of bun heels (and/or bun crowns) dispensed into the buttering and toasting system such that the paddle does not plastically deform or "squish" bun heels (and/or crown heels) passing through the buttering and toasting system. For example, each compression paddle can include a first rigid section coupled to the actuator, a second rigid section defining a broad surface for contacting and compressing bun heels, and a metallic spring arranged between and connecting the first rigid section to the second rigid section, the metallic spring sized for a spring constant suitable to prevent plastic deformation of a bun heel (or a bun crown) by the paddle. In another example, the compression paddle can be of a flexible material and can define a flexure section of sufficient length and sufficiently minimal cross-section between the camshaft and the cup such that the flexure section yields (i.e., bends) under resistance by the bun heel to prevent over-compression of the bun heel. However, the compression paddle can be of any other suitable form and/or of any other suitable material.

Alternatively, because the slicing mechanism can cut bun heels of substantially uniform thickness and dispense these bun heels into the buttering and toasting system, each compression paddle in a first set of compression paddles configured to handle bun heels can include a cam follower and a cup rigidly coupled to the cam follower and configured to constrain the bun heel directly against the second toasting surface 327B. In this implementation, each cam follower coupled to a compression paddle in the first set of compression paddles can be position to achieve a target gap between a cup at the end of the corresponding compression paddle and the toasting surface 327 (or the buttering surface), wherein the target gap approximates the thickness of bun heels cut by the slicing mechanism less a target compression of the bun heels onto the toasting surface 327 (e.g., 2 millimeters). However, because the height of whole bread buns may vary and because the slicing mechanism may dispense bun crowns of varying heights, each compression paddle in the second set of compression paddles configured to handle bun crowns can include: a cam follower; a cup opposite the cam follower and configured to constrain a bun heel directly against the first toasting surface 327; and a spring (or flexure, or other flexible structure or mechanism) interposed between the cam follower and the cup and characterized by an effective spring constant less than a spring constant characteristic of a material of the bun crown. Each compression paddle in the second set of compression paddles can therefore be "tuned" to apply a target pressure onto an adjacent bun crown, wherein the target pressure is sufficient to achieve proper contact between the interior surface of the bun crown and the second toasting surface 327B but not so great as to permanently deform the bun crown, as described above.

3.5 Actuator

The actuator 331 selectively transitions the compression paddles between the release position and the compress position and selectively transitions the gate paddles between the retain position and the dispense position according to an operational sequence to sequentially advance a series of bun heels down the toasting surface 327. Generally, the actuator 331 functions to drive the compression paddles between compress and release positions and to drive the gate paddles between restrain and dispense positions according to the operational sequence in order to serially shift buns downward from the slicing mechanism, into the butter stage 310, and along the toasting surface 327 (and into a chute that deposits the bun heels into a box or other container).

In one implementation, the actuator 331 includes a rotary motor (e.g., an electric stepper motor, a DC motor, a servo motor, an air motor) and a camshaft 332 actuated by the rotary motor. In this implementation, the camshaft 332 can be arranged vertically and adjacent the toasting surface 327 with cam lobes 333 aligned with each compression paddle and with each gate paddle along the butter stage 310 and the toast stage 320. In one example implementation, each paddle is retained by a pivot between the camshaft 332 and the toasting surface 327, and each paddle defines a cam follower extending from the pivot toward the camshaft 332 to contact a corresponding cam lobe on the camshaft 332. In another example implementation, each paddle is retained by a pivot offset from the toasting surface 327, the camshaft 332 is arranged between the pivots and the toasting surface 327, and each paddle defines a cam follower (between the corresponding pivot and broad surface that contacts bun heels) extending toward the camshaft 332 to contact a corresponding cam lobe. Thus, as the rotary motor rotates the camshaft 332, the cam lobes on the camshaft 332 can contact corresponding cam followers of the compression and gate paddles to transition the compression and gate paddles between the compress and release positions and between the restrain and dispense positions, respectively.

In one example, the buttering and toasting system can include: a first paddle assembly 311 including a first compression paddle 311A and a first gate paddle 311B, wherein the first compression paddle is mechanically coupled to a first lobe on the camshaft 332, and wherein the first gate paddle is arranged vertically below the first compression paddle and is mechanically coupled to a second lobe on the camshaft 332; and a second paddle assembly 322 including a second compression paddle 322A and a second gate paddle 322B, wherein the second compression paddle is arranged vertically below the first gate paddle and is mechanically coupled to a third lobe on the camshaft 332, and wherein the second gate paddle is arranged vertically below the second compression paddle and is mechanically coupled to a fourth lobe on the camshaft 332, as shown in FIGS. 9 and 10A.

In the foregoing implementation, each cam lobe can define a closed track that captures the cam follower coupled to the corresponding paddle such that the position of the corresponding paddle is (nearly) fully constrained throughout actuation of the paddle. Alternatively, the buttering and toasting system can include a spring 335 arranged between each cam lobe and the corresponding paddle and configured to drive the cam follower into the cam lobe. In one example, the buttering and toasting system includes a coil spring (e.g., a hairpin spring) between each cam and cam follower and configured to drive the cam follower onto the corresponding cam lobe. In this example, the spring can be characterized by an effective spring constant (projected at the cup) less than a spring constant characteristic a material of the type of bun dispensed by the slicing mechanism in order to prevent over-compression of bun heel (or bun crown), as described above.

Alternatively, the buttering and toasting system can include a foam panel 334 (e.g., a silicone foam panel) adjacent the camshaft 332 and opposite the toasting surface 327, and each paddle can include a finger extending from its cam follower to the foam panel 334. The foam panel 334 can yield to a finger as the corresponding paddle is open and closed, and the foam can supply sufficient resistance to the finger to drive the cam follower of the paddle onto the corresponding cam lobe and/or toward either the fully-open or fully-closed position adjacent the toasting surface 327. In this example, the (single) foam panel 334 can thus locate (e.g., provide a restorative spring force onto) all paddles in the set of paddle assemblies, and the foam panel 334 can be replaced in a single unit, such as if the foam panel 334 is soiled or worn. The foam panel 334 can also be characterized by a durometer tailored to the hardness of buns dispensed into the buttering and toasting system such that a suitable amount of pressure is applied to bun heels (and bun crowns) by the compression paddles without substantially (or plastically) deforming the bun heels (And bun crowns), as described above. The foam panel 334 can therefore also be exchanged with a second foam panel 334 of alternate durometer in order to accommodate a different type of bun (e.g., harder buns, softer buns) loaded into the bun dispenser.

The camshaft 332 can define a set of cam lobes at various phases and characterized by various dwell durations such that continuous rotation of the camshaft 332 at a substantially constant speed cycles the compression paddles between compress and release positions and the gate paddles between restrain and dispense positions according to the operational sequence, thereby serially and intermittently releasing a column of bun heels downward along the buttering surface and the toasting surface 327. In particular, a first compression paddle adjacent the butter stage 310 can open (i.e., transition from the compress position into the release position) while a first gate paddle adjacent the butter stage 310 remains closed in order to receive and vertically support a first bun heel received from the slicing mechanism above. As the camshaft 332 rotates, a first cam lobe can release (or actively drive) the first compression paddle into the first bun heel to force the first bun heel against the permeable surface 314 of the butter stage 310. Subsequently, the first gate paddle can open as a second compression paddle adjacent the toast stage 320 also opens. With the second gate paddle adjacent the toast stage 320 closed, the first compression paddle can open to release the first bun heel from the butter stage 310 into the toast stage 320. The second compression paddle can then close to drive the first bun heel against the toasting surface 327 as the first gate paddle closes in preparation to receive a second bun heel from the slicing mechanism above. Additional toast sub-stages below the second compression paddle and the second gate paddle can further cooperate to receive the first bun heel, to compress the first bun heel against the toasting surface 327 to achieve a target degree of toast for the corresponding toast sub-stage, and to release the first bun heel downward.

Therefore, the actuator 331 can rotate the camshaft 332 to: sequentially open the first compression paddle to catch the bun crown on the first gate paddle; close the first compression paddle to compress the sliced face of bun crown against the permeable surface 314; open the first gate paddle; open the first compression paddle to release the bun crown from the butter stage 310. The actuator 331 can further rotate the camshaft 332 to: sequentially open the second compression paddle to catch the bun crown on the second gate paddle; close the second compression paddle to compress the sliced face of bun crown against the toasting surface 327; open the second gate paddle; and open the second compression paddle to release the bun crown toward the third paddle assembly 323.

Alternatively, in a paddle assembly, a gate paddle can open after a corresponding compression paddle to release a heel bun into a lower stage, or a compression paddle and a corresponding gate paddle in a paddle assembly can open substantially simultaneously to release a heel bun into a lower stage.

In one example, the buttering and toasting system includes: a first paddle assembly 311 including a first compression paddle 311A mechanically coupled to a first lobe on the camshaft 332 and a first gate paddle 311B arranged vertically below the first compression paddle and mechanically coupled to a second lobe on the camshaft 332; a second paddle assembly 322 including a second compression paddle 322A arranged vertically below the first gate paddle and mechanically coupled to a third lobe on the camshaft 332 and a second gate paddle 322B arranged vertically below the second compression paddle and mechanically coupled to a fourth lobe on the camshaft 332; and a third paddle assembly 323 including a third compression paddle 323A arranged vertically below the second gate paddle and mechanically coupled to a fifth lobe on the camshaft 332 and a third gate paddle 323B arranged vertically below the third compression paddle and mechanically coupled to a sixth lobe on the camshaft 332. In this example, the fifth lobe and the sixth lobe can be phased on the camshaft 332 in advance of the third lobe and the fourth lobe, and the third lobe and the fourth lobe can be phased on the camshaft 332 in advance of the first lobe and the second lobe. The actuator 331 can therefore rotate the camshaft 332 in a forward direction to serially release a third bun crown from the third paddle assembly 323, to release a second bun crown from the second paddle assembly 322 into the third paddle assembly 323, and to then release a first bun crown from the first paddle assembly 311 into the second paddle assembly 322.

Furthermore, for the buttering and toasting system that includes four paddle assemblies, the camshaft 332 can actuate the compression and gate paddles in the four paddle assemblies according to the operational sequence shown in FIG. 10A. For example, in addition to the example described above, the toast stage 320 can further include a fourth paddle assembly 324 arranged vertically below the third paddle assembly 323 and configured to catch a bun heel (or a bun crown) released from the third paddle assembly 323, to compress the sliced face of the bun heel directly against the toasting surface 327, and to release the bun heel from the toast stage 320.

The actuator 331 can thus rotate the camshaft 332 at a substantially constant speed such that bun heels enter into subsequent stages of the buttering and toasting system at a substantially constant rate, thereby yielding a substantially consistent degree of toast on the interior surface of each bun heel passing through the buttering and toasting system. The actuator 331 can also vary the speed of rotation of the camshaft 332 to alter an amount of time that a bun heels contacts (e.g., is compressed against) the toasting surface 327, thereby controlling a degree of toast of the bun heel. For example, for a buttering and toasting system that includes four stages for a total bun heel capacity of four bun heels at any time during operation, the buttering and toasting system can track an amount of time that each bun heel is in contact with the toasting surface 327. In this example, the automated foodstuff assembly apparatus can receive custom hamburger orders specifying desired toast levels (e.g., light, medium, or dark or levels 1 through 10) and can assign a toast level to a particular bun (i.e., to each bun heel and bun crown pair) based on a particular custom hamburger order corresponding to the particular bun. The actuator 331 can thus speed up and slow down rotation of the camshaft 332 as the particular bun enters and exits the butter and toast stages to achieve (approximately) the toast level specified for the particular bun in the custom hamburger order.

In one implementation, the buttering and toasting system adjusts the degree to which a bun heel is toasted by timing release of the bun heel from the lowest paddle assembly in the toast stage 320. In the example of the buttering and toasting system that includes four paddle assemblies, the fourth (i.e., the lowest) paddle assembly can be phased in advance of the third paddle assembly 323, which can be phased ahead of the second paddle assembly 322, etc. The actuator 331 can thus index the camshaft 332 forward to release a bun heel from the fourth paddle assembly 324 once a target toast duration for the bun heel. In this example, the actuator 331 can close the second paddle assembly 322 against the bun heel for a static toast duration, close the third paddle assembly 323 against the bun heel for the same static toast duration, and then close the fourth paddle assembly 324 against the bun heel for a variable toast duration between a minimum toast duration defined by a maximum speed of the camshaft 332 and the static toast duration, as shown in FIG. 10B. In particular, for a lightest degree of toast specified for a particular bun heel currently in the third paddle assembly 323, the actuator 331 can rotate the camshaft 332 through a full rotation to release the particular bun heel from the third paddle assembly 323 into the fourth paddle assembly 324, to release a second bun heel from the second paddle assembly 322 into the third paddle assembly 323, to release a third bun heel from the first paddle assembly 311 into the third paddle assembly 323, etc., thereby indexing the set of buns down the toast stage 320. In this example, the actuator 331 can continue to rotate camshaft 332 past a full rotation (e.g., 30° passed a full 360° rotation) at a full rotation speed to immediately release the particular bun heel from the fourth paddle assembly 324, thereby achieving a minimum degree of toast on the particular bun heel. Alternatively, the actuator 331 can pause between the full 360° rotation and the 30° additional rotation—which releases the particular bun heel from the fourth paddle assembly 324—for a variable toast duration in order to corresponding to a higher degree of toast for the bun heel. Yet alternatively, the actuator 331 can pause for the full static toast duration between the full 360° rotation and a subsequent full 360° rotation to index the set of buns down the toast stage 320 and to release the particular bun heel from the toast stage 320. Therefore, for each bun heel (and for each bun crown) passing through the toast stage 320, the buttering and toasting system can calculate a variable toast duration proportional to a custom degree of toast associated with a bun heel (and bun crown) and can release the bun heel from the final paddle assembly in the toast stage 320 once the bun has been compressed against the toasting surface 327 by the final paddle assembly for the variable toast duration.

However, the actuator 331 can manipulate the compression and gate paddles in any other suitable way to index bun heels through the buttering and toasting system to achieve a consistent, target, and/or custom degree of toast on each bun heel dispensed there through.

In a similar implementation, the buttering and toasting system can include a first camshaft 332 and a second camshaft 332, the first camshaft 332 defining lobes that actuate the set of compression paddles, and the second camshaft 332 defining lobes that actuate the set of gate paddles. The actuator 331 (e.g., one or more electric motors) can thus drive the first and second camshafts in unison or independently to advance bun heels through the butter and toast stages.

In another implementation, the buttering and toasting system can include a set of actuators that are independently controlled, and each actuator in the set can be coupled to one paddle (or a subset of paddles in the sets of paddles) to selectively and independently open and close each paddle. For example, each actuator in the set can include an independently-controlled pneumatic or electromechanical linear solenoid coupled to a corresponding compression paddle or gate paddle. However, the buttering and toasting system can include any other type and/or number of actuators that can function in any other way to actuate the compression and gate paddles to move bun heels across the vertical surface of the butter stage 310 and the toast stage 320.

3.6 Dispenser

One variation of the buttering and toasting system further includes a dispenser 350 that functions to guide the bun heel into a box (or other container). Generally, the dispenser 350 functions to receive a bun heel released—in a substantially vertical orientation—from a final toasting stage, to transition the bun heel into a substantially horizontal, toasted-side-up orientation, and to deposit the bun heel into a sandwich box. (Alternatively, the dispenser 350 can deposit the bun heel onto a plate, onto a sandwich or hamburger assembly platen, etc.)

In one implementation, the buttering and toasting system includes a dispenser paddle assembly 355 arranged below the final (e.g., the third or the fourth) paddle assembly and configured to receive the bun heel (or the bun crown) from the toast stage 320, to rotate the bun heel, and to dispense the bun heel into a container arranged below the dispenser paddle assembly with the sliced face of the bun heel facing upward toward the toast stage 320. In this implementation, the dispenser paddle assembly can include a slide 356, a layer paddle 357, and a box support platen 158, as shown in FIG. 8. In this implementation, the slide 356 extends downward (from substantially vertical) proximal a lowest edge of the toasting surface 327 (and/or proximal a lowest toasting gate along the toasting surface 327) and curves away from the toasting surface 327 such that a bun heel released onto the slide 356 is released toward the layer paddle 357 at an angle from horizontal with the exterior surface of the bun heel facing downward and the toasted interior surface of the bun heel facing upward. The layer paddle 357 defines a leading edge that extends toward and under the exit of the slide 356, and the layer paddle 357 is pivot about a laterally-supported axle by a first actuator (e.g., an electromechanical solenoid) coupled to the lateral axle or to the layer paddle 357. Once a bun heel lands on the layer paddle 357 (with toasted face up) after release from the slide 356, the first actuator pivots the leading edge of the layer paddle 357 downward, thereby dispensing the bun heel (with toasted face up) into an open box arranged below. The box support platen 158 is arranged below the layer paddle 357 and the kicker paddle 358 and aligns one side of an open hinged box below the dispenser 350. In particular, the box support platen 158 can support an individual or a stack of cardboard boxes, Styrofoam boxes, paper boxes, or boxes of any other suitable material defining a first box halve hinged to a second box halve (e.g., by a living hinge), the first box halve defining a circumferential wall surrounding a top of the box (as defined when the box is closed), and the second box halve defining a circumferential wall surrounding a bottom of the box, each halve of the box thus defining an interior corner along and below the hinge of the box when the box is open. Thus, by pivoting downward toward an open box below, the layer paddle 357 can release the bun heel toward the interior corner of the second halve of the box. With one end of the bun heel constrained by the interior corner of the second halve of the box, the bun heel can drop fully into the second halve of the box with the bottom of the bun heel lying against the bottom of the second halve of the box and the toasted surface of the bun heel facing upward.

In the foregoing implementation, the dispenser 350 further includes a kicker paddle 358 arranged under the exit of the slide 356 and opposite the layer paddle 357. In particular, the kicker paddle 358 can be supported by a second laterally-supported axle driven by a second actuator, and the actuator can pivot the kicker paddle 358 toward the layer panel if a heel bun dispensed onto the layer paddle 357 sticks to the layer paddle 357 or falls incorrectly into the interior corner of the second halve of the box. In particular, the kicker paddle 358 can tap a stuck bun heel off of the layer paddle 357 and/or realign a bun heel within the second halve of the box.

In the foregoing implementation, the slide 356 can define a concave (e.g., semicircular, elliptical) profile along its outlet edge. The slide 356 can also include one or more linear section, curvilinear sections, or sections of any other suitable geometry. Furthermore, a wall or other surface behind the layer paddle 357 opposite the slide 356 output can be substantially elastic or "soft" to absorb impact of a bun heel on the wall. For example, a silicone foam sheath can be arranged over a vertical wall behind the layer paddle 357, and a bun heel can contact and can then be slowed by the silicone foam sheath before being dispensed into the second halve of the box. The dispenser 350 can also include an actuatable plunger arranged over the second end of the box and extensible toward the second halve of the box to settle a bun heel dispensed therein. The dispenser 350 can additionally or alternatively include a guide—such as a flapper—arranged over the second halve of the box or along a conveyor supporting the box support platen 158, wherein the guide contacts a bun heel contained within the second halve of a box to drive the bun heel into a particular corner of the second halve of the box. However, the dispenser 350 can include any other one or more components arranged in any other way within the automated foodstuff assembly apparatus, and the components of the dispenser 350 can cooperate in any other suitable way to deposit a bun heel from a final toasting stage adjacent the toasting surface 327 into a halve of an open box below.

The dispenser 350 can selectively manipulate the kicker paddle 358 and the layer paddle 357 as each additional bun is dispensed from the toasting surface 327, such as based on sensed contact between a bun heel or crown and a mechanical sensor arranged within the chute or based on a position of a bun heel or crown determined by analyzing an image of the chute area captured by a camera (or other optical sensor) based on one or more machine vision techniques. However, the dispenser 350 can selectively manipulate the kicker paddle 358 and the layer paddle 357 based on or in response to any other detected event or trigger detected in any other way.

Figure 12:
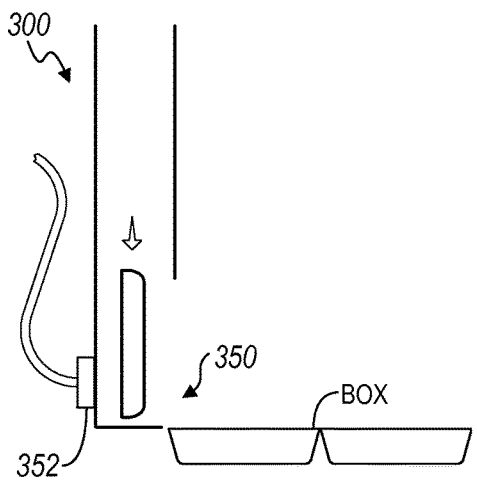
FIG. 12 is a schematic representation of one variation of the third system.

In another implementation, the dispenser 350 includes a nozzle 351 coupled to a compressed gas (e.g., air, nitrogen) supply via a valve. The nozzle is arranged proximal an outlet end of the toasting surface 327, as shown in FIG. 12, and the dispenser 350 selectively actuates the valve to displace a bun heel from the toasting surface 327 into a box (or other container) below the toasting surface 327.

Figure 13:
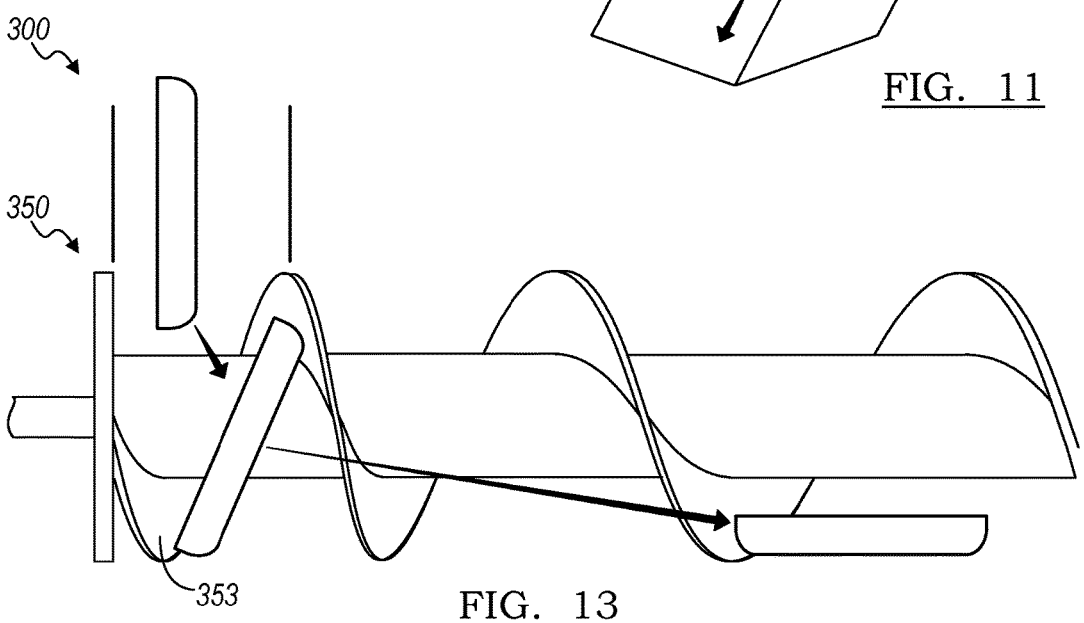
FIG. 13 is a flowchart representation of one variation of the third system.

In another implementation, the dispenser 350 includes a variable-pitch auger 353 arranged below the toasting surface 327, as shown in FIG. 13. In this implementation, the auger defines a narrow pitch at its inlet side directly below the outlet end of the toasting surface 327, the inlet end of the auger thus supporting a bun heel substantially vertically on its end once dispensed from the toasting surface 327, as shown in FIG. 13. The dispenser 350 can then trigger a rotary actuator coupled to the auger to drive the bun heel along the auger and toward an outlet end of the auger. However, the auger can define an increasingly wider pitch toward its outlet to enable a bun heel to rotate down into a horizontal, face up position proximal an outlet end of the auger. The auger can then dispense the bun heel face up into an open box (or other container) arranged below the outlet end of the auger, as shown in FIG. 13. The geometry of the auger can also be such that less than one full rotation of the auger can rotate a bun heel from the substantially vertical orientation—as received from bun toaster subsystem—into a substantially horizontal orientation for dispensation into a box below.

3.7 Bun Crown

One variation of the buttering and toasting system additionally or alternatively includes: a second butter stage 310 including a second substantially vertical surface dispensing butter onto a bun crown; a second toasting surface 327B including a second substantially vertical translucent toasting surface 327; a second set of compression paddles arranged vertically in a stack adjacent and substantially parallel the second toasting surface 327B, a compression paddle in the second set of paddles operable between a compress position and a release position, a compression paddle depressing a bun crown against the second toasting surface 327B in the compress position and releasing the bun crown in the release position; a second set of gate paddles, a gate paddle in the second set of gate paddles arranged below a corresponding compression paddle in the second set of compression paddles, cooperating with the corresponding compression paddle to define a toasting stage, and operable between a retain position and a dispense position, a gate paddle vertically supporting a bun crown in the retain position and releasing the bun crown in the dispense position; and an actuator (physically coextensive or physically distinct from the actuator described above) selectively transitioning the second set of compression paddles between the release position and the compress position and selectively transitioning the second set of gate paddles between the retain position and the dispense position according to a sequence to sequentially advance a series of bun crowns down the second toasting surface 327B. In this variation, the buttering and toasting system can also additionally or alternatively a second dispenser that guides a bun crown into a box.

In this variation, the second butter stage 310, the second sets of compression and gate paddles, the second toasting surface 327B, the second actuator, and/or the second dispenser can operate substantially simultaneously with the butter stage 310, the toast stage 320, the set or paddle assemblies, etc. described above to substantially simultaneously receive a bun crown and a bun heel, to butter interior surfaces of both the bun crown and the bun heel, to toast the interior surfaces of both the bun crown and the bun heel, and to dispense the bun crown and the bun heel, such as into a first halve and a second halve of an open box, such as shown in FIG. 8. In this implementation, a single camshaft 332—driven by the actuator as described above—can actuate compression and gate paddles in both the first and second sets of paddle assemblies. Alternatively, a first camshaft 332 can actuate the first set of paddle assemblies, a second camshaft 332 can actuate the second set of paddle assemblies, and a single actuator can drive both the first and second camshafts. Yet alternatively, a first actuator can drive a first camshaft 332 to actuate the first set of paddle assemblies, and a second actuator can drive a second camshaft 332 to actuate the second set of paddle assemblies.

The butter stage 310 can also incorporate a single vessel 312 into which (liquefied or heated) butter is pumped or stored, and perforated or otherwise butter-permeable surfaces on a first side and on a second side of the vessel 312 (opposite the first side) can dispense butter onto bun heels and onto bun crowns, respectively. Alternatively, the butter stage 310 and the second butter stage 310 can be discrete components within the automated foodstuff assembly apparatus. Furthermore, as described above, a single heating element 328 or set of heating elements can be interposed between the toasting surface 327 and the second toasting surface 327B to define a substantially transparent toasting unit, and the first and second sets of paddle assemblies can retain bun heels bun and crowns along the first and second toasting surfaces, respectively, as shown in FIG. 9, such that both a bun heel and a matched bun crown can be viewed simultaneously from various vantage points around the buttering and toasting system. However, the buttering and toasting system for bun heels and/or the buttering and toasting system for bun crowns can be arranged in any other way and can cooperate in any other way to received freshly-sliced bun heels and bun crowns and to output freshly-buttered and freshly-toasted bun heels and bun crowns, respectively.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A system for dispensing bread buns into a bun slicing mechanism comprising:
a receiver;
a hopper comprising an elongated housing configured to contain a row of whole bread buns, wherein the elongated housing defines a discharge end configured to transiently engage the receiver and to dispense whole bread buns into the receiver, and wherein the elongated housing defines a pressurized end opposite the discharge end;
a piston arranged within the hopper between the pressurized end of the hopper and the row of whole bread buns;
a permeable seal interposed between an interior wall of the hopper and an adjacent surface of the piston, wherein the permeable seal cooperates with the hopper and the piston to define a closed volume between the pressurized end of the hopper and the piston, and wherein the permeable seal is configured to bleed gas from the closed volume toward the discharge end of the hopper;
a gas supply intermittently supplying gas into the closed volume to displace the piston toward the discharge end of the hopper; and
a roller arranged between the hopper and the receiver and extending into a boundary defined by a cross-section of the hopper projected toward the receiver parallel to an axis of the hopper.

2. The system of claim 1, wherein:
the hopper defines a first planar surface and a second planar surface substantially normal to the first planar surface;
the first planar surface extending from the pressurized end to the discharge end and configured to support a vertical side of each whole bread bun in the row of whole bread buns;
the second planar surface extending from the pressurized end to the discharge end and configured to support a bottom side of each whole bread bun in the row of whole bread buns.

3. The system of claim 2, wherein:
the roller defines a rotational axis parallel to the first planar surface and defining a first rolling surface offset from the first planar surface toward the axis of the hopper;
the system further comprises a second roller defining a second rotational axis parallel to the second planar surface and defining a second rolling surface offset from the second planar surface toward the axis of the hopper; and
the roller and the second roller cooperate to inhibit release of one of the whole bread buns in the row of whole bread buns, into the receiver.

4. The system of claim 1, further comprising a distance sensor aligned with the axis of the hopper opposite the receiver, wherein:
the distance sensor is configured to output a signal proportional to a distance between the distance sensor and a surface of a nearest one of the whole bread buns in the row of whole bread buns arranged in the hopper; and
during a dispense cycle, the gas supply supplies gas to the closed volume at a flow rate proportional to the signal output by the distance sensor.

5. The system of claim 4, wherein:
the gas supply comprises a pressurized gas reservoir and a valve arranged between the pressurized gas reservoir and the closed volume;
during the dispense cycle, the valve intermittently opens according to a duty cycle proportional to the signal output by the distance sensor; and
the valve closes in response to a step change in the signal output by the distance sensor to complete the dispense cycle.

6. The system of claim 1, further comprising:
a pop-off valve fluidly coupled to the pressurized end of the hopper,
wherein the pop-off valve opens in response to a detection of release of one of the whole bread buns in the row of whole bread buns, into the receiver during a dispense cycle.

7. The system of claim 1, wherein the piston comprises a tongue extending toward the discharge end of the hopper and over a crown of one of the whole bread buns adjacent the piston in the row of whole bread buns.

8. The system of claim 1, wherein:
the piston defines a first end facing the pressurized end of the hopper and a second end facing the discharge end of the hopper;
the permeable seal comprises a first seal portion and a second seal portion; the first seal portion is arranged about a circumference of the piston adjacent the first end of the piston; the second seal portion is arranged about the circumference of the piston adjacent the second end of the piston; and the first seal portion and the second seal portion cooperate to bleed gas from the first end of the piston to the second end of the piston.

9. The system of claim 1, further comprising a receptacle offset from the receiver, wherein the receptacle is:
fluidly coupled to the gas supply,
configured to transiently receive the pressurized end of the hopper,
configured to seal against the pressurized end of the hopper, and
configured to cooperate with the receiver to transiently support the hopper.

10. The system of claim 1, further comprising:
a second receiver adjacent and offset above the receiver;
a second hopper configured to contain a second row of whole bread buns, the second hopper defining a second discharge end configured to transiently engage the second receiver and to dispense whole bread buns into the second receiver, the second hopper defining a second pressurized end opposite the second discharge end;
a second piston arranged within the second hopper between the second pressurized end of the second hopper and the second row of whole bread buns; and
a second permeable seal interposed between an interior wall of the second hopper and an adjacent surface of the second piston, wherein:
the second permeable seal cooperates with the second hopper and the second piston to define a second closed volume between the second pressurized end of the second hopper and the second piston,
the second permeable seal is configured to bleed gas from the second closed volume toward the second discharge end of the second hopper,
wherein the gas supply selectively supplies gas:
to the closed volume to advance the hopper toward the discharge end of the hopper; and
to the second closed volume to advance the second hopper toward the second discharge end of the second hopper.

11. The system of claim 1, further comprising:
a chute defining a load end, defining a slice end vertically below the load end, and configured to receive the whole bread buns from the receiver between the load end and the slice end;
a blade extending across the chute proximal the slice end of the chute; and
a cutting block arranged in the chute and configured to advance from a load position to a pierce position to a slice position during a dispense cycle,
wherein:
the cutting block is adjacent the load end of the chute in the load position to receive one of the whole bread buns from the receiver,
the cutting block is arranged between the receiver and the blade in the pierce position offset from the blade by less than a length of the one of the whole bread buns for a pierce duration to pierce the one of the whole bread buns with the blade, and
the cutting block extends past the blade in the slice position to sever a crown of the one of the whole bread buns from a heel of the one of the whole bread buns.

* * * * *

UNITED STATES PATENT AND TRADEMARK OFFICE
CERTIFICATE OF CORRECTION

PATENT NO. : 10,086,525 B2
APPLICATION NO. : 14/868763
DATED : October 2, 2018
INVENTOR(S) : Engel-Hall et al.

It is certified that error appears in the above-identified patent and that said Letters Patent is hereby corrected as shown below:

In the Specification

| | |
|---|---|
| Column 5, Line 19 | "(surface" should be --surface-- |
| Column 6, Line 26 | "via" should be --via.-- |
| Column 8, Line 15 | "50.8" should be --5.8-- |
| Column 8, Line 15 | "30.8" should be --3.8-- |
| Column 9, Line 1 | "no" should be --110-- |
| Column 10, Line 35 | "no)" should be --110)-- |
| Column 10, Line 53 | "no" should be --110-- |
| Column 11, Line 58 | "no" should be --110-- |
| Column 11, Line 62 | "no," should be --110,-- |
| Column 12, Line 9 | "no." should be --110.-- |
| Column 12, Line 11 | "no)," should be --110),-- |
| Column 12, Line 28 | "etc." should be --etc.)-- |
| Column 13, Line 17 | "no" should be --110-- |
| Column 13, Line 20 | "no" should be --110-- |

Signed and Sealed this
Thirty-first Day of May, 2022

Katherine Kelly Vidal
*Director of the United States Patent and Trademark Office*

CERTIFICATE OF CORRECTION (continued)
U.S. Pat. No. 10,086,525 B2

Column 13, Line 33     "no" should be --110--

Column 13, Line 40     "no)." should be --110).--

Column 15, Line 50     "no" should be --110--

Column 20, Line 41     "Silo;" should be --S110;--

Column 30, Line 46     "FIGURE ii" should be --FIG. 11--

Column 32, Line 66     "(And" should be --(and--